(12) United States Patent
Kim et al.

(10) Patent No.: US 10,038,486 B2
(45) Date of Patent: Jul. 31, 2018

(54) METHOD FOR SELECTING TRANSMIT ANTENNA AND ELECTRONIC DEVICE FOR SUPPORTING THE SAME

(71) Applicant: Samsung Electronics Co., Ltd., Suwon-si, Gyeonggi-do (KR)

(72) Inventors: Kee Hoon Kim, Seoul (KR); Hyoungjoo Lee, Suwon-si (KR); Byung Gil Lee, Hwaseong-si (KR); Chaiman Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/436,153

(22) Filed: Feb. 17, 2017

(65) Prior Publication Data

US 2017/0244456 A1 Aug. 24, 2017

(30) Foreign Application Priority Data

Feb. 19, 2016 (KR) ........................ 10-2016-0020038

(51) Int. Cl.
| | |
|---|---|
| H04M 1/00 | (2006.01) |
| H04B 17/00 | (2015.01) |
| H04B 1/06 | (2006.01) |
| H04B 7/06 | (2006.01) |
| H04B 17/10 | (2015.01) |
| H04B 1/3827 | (2015.01) |

(52) U.S. Cl.
CPC ......... *H04B 7/0602* (2013.01); *H04B 1/3833* (2013.01); *H04B 17/102* (2015.01)

(58) Field of Classification Search
CPC ........ H04B 1/006; H04B 7/04; H04B 7/0602; H04B 7/0608; H04B 7/061; H04B 7/0802; H04B 7/0814; H04B 17/318; H04W 52/04; H04W 52/241
USPC ....... 455/101, 103, 115.1, 115.3, 272, 277.1, 455/277.2, 575.7
See application file for complete search history.

(56) References Cited

U.S. PATENT DOCUMENTS

| | | | | |
|---|---|---|---|---|
| 7,308,283 | B2 * | 12/2007 | Ogawa ................ | H04B 7/0602 455/101 |
| 7,489,662 | B2 * | 2/2009 | Hosomi ............... | H04B 7/0805 455/425 |
| 8,831,532 | B2 * | 9/2014 | Nukala ............... | H04W 52/241 455/115.3 |
| 9,070,974 | B2 * | 6/2015 | Hu ....................... | H04B 7/0608 |
| 9,287,954 | B2 * | 3/2016 | Ramkumar .......... | H04B 7/0608 |

(Continued)

FOREIGN PATENT DOCUMENTS

KR   10-2015-0112629 A   10/2015

*Primary Examiner* — Quochien B Vuong
(74) *Attorney, Agent, or Firm* — Jefferson IP Law, LLP

(57) ABSTRACT

An electronic device is provided. The electronic device includes a plurality of antennas and a communication circuit configured to electrically connect with at least one of the plurality of antennas, wherein the communication circuit is configured to obtain information of a level of a transmit power and transmit a signal based on a designated antenna among the plurality of antennas if the level of the transmit power is less than a level, determine an antenna for signal transmission among the plurality of antennas if the level of the transmit power is greater than or equal to the level, and perform an antenna switching operation of selecting the determined antenna.

18 Claims, 12 Drawing Sheets

(56) References Cited

U.S. PATENT DOCUMENTS 9,680,219 B2 * 6/2017 Filipovic .................. H01Q 3/24
2015/0282196 A1 10/2015 Kim et al.

* cited by examiner

METHOD FOR SELECTING TRANSMIT ANTENNA AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Feb. 19, 2016 in the Korean Intellectual Property Office and assigned Serial number 10-2016-0020038, the entire disclosure of which is hereby incorporated by reference.

TECHNICAL FIELD

The present disclosure relates to technologies of transmitting a signal of a specified frequency band using at least one of a plurality of antennas.

BACKGROUND

Recently, with the development of information and communication technologies, electronic devices which may transmit and receive data over network devices, such as base stations have been developed. Therefore, users may freely use networks irrespective of their locations and time. The electronic device may include at least one antenna to communicate with base stations.

The electronic device of the related art is designed to transmit data based on a designated antenna irrespective of communication environments, thus, inefficiently operating antennas based on situations.

Therefore, a need exists for a method for selecting a transmit antenna to allow an electronic device including a plurality of antennas to select an antenna with better efficiency and transmit data via the selected antenna and an electronic device for supporting the same.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for selecting a transmit antenna to allow an electronic device including a plurality of antennas to select an antenna with better efficiency and transmit data via the selected antenna and an electronic device for supporting the same.

In accordance with an aspect of the present disclosure, an electronic device is provided. The electronic device includes a plurality of antennas and a communication circuit configured to electrically connect with at least one of the plurality of antennas, wherein the communication circuit is configured to obtain information of a level of a transmit power and transmit a signal based on a designated antenna among the plurality of antennas if the level of the transmit power is less than a level, determine an antenna for signal transmission among the plurality of antennas if the level of the transmit power is greater than or equal to the level, and perform an antenna switching operation of selecting the determined antenna.

In accordance with another aspect of the present disclosure, a method for selecting a transmit antenna is provided. The method includes selecting and operating antennas of one group corresponding to a type of a network and an available frequency band among a plurality of antennas, obtaining information of a level of a transmit power of the selected antenna used for data transmission among the plurality of antennas and performing signal transmission based on the selected antenna if the level of the transmit power of the selected antenna used for data transmission among the plurality of antennas is less than a level and selecting an antenna for signal transmission among the plurality of antennas if the level of the transmit power is greater than or equal to the level.

In accordance with another aspect of the present disclosure, a storage medium is provided. The storage medium includes a memory configured to store at least one instruction and a processor configured to execute instructions stored in the memory. The instructions executed by the processor may be configured to select and operate antennas of one group corresponding to a type of a network and an available frequency band among a plurality of antennas and perform signal transmission based on the selected antenna if a level of a transmit power of the selected antenna used for data transmission among the plurality of antennas is less than a level and select an antenna for signal transmission among the plurality of antennas if the level of the transmit power is greater than or equal to the level.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
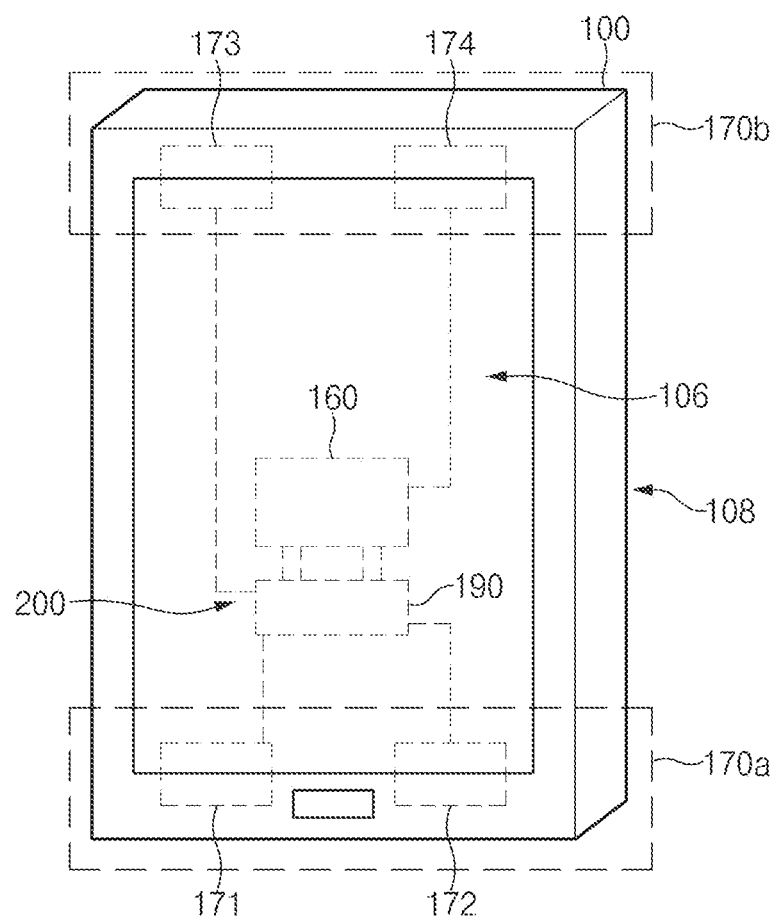
FIG. 1 is a block diagram schematically illustrating a configuration of an electronic device according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the disclosure disclosed herein, the expressions "have", "may have", "include" and "comprise", or "may include" and "may comprise" used herein indicate existence of corresponding features (e.g., elements, such as numeric values, functions, operations, components, and the like) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like, used herein may refer to various elements of various embodiments of the present disclosure, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. A central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude various embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), motion picture experts group phase 1 or phase 2 (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment of the present disclosure, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment of the present disclosure, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). In various embodiments of the present disclosure, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a block diagram schematically illustrating a configuration of an electronic device according to an embodiment of the present disclosure.

Referring to FIG. 1, an electronic device 100 according to an embodiment may include a display 106, a case 108, a communication circuit 200 (e.g., a processor 160 and a switching module 190 (or switching circuit)), and a plurality of antennas 171 to 174. Additionally or alternatively, the electronic device 100 may further include a memory which stores data associated with operating the processor 160.

The display 106 may output at least one screen interface associated with operating the electronic device 100. According to an embodiment of the present disclosure, the display 106 may output a screen interface associated with operating a communication function of the electronic device 100. Alternatively, the display 106 may output visual information about a type (e.g., 2nd generation (2G), 3rd generation (3G), long term evolution (LTE), or the like) of a communication scenario currently operated. The visual information may include, for example, an indication icon displayed on an indication region (e.g., an upper region of the display 106). Alternatively, the visual information may include a message according to a type of a communication scenario displayed a region of the display 106. Alternatively, the visual information may include information displayed on a region of the display 106, based on a change in a communication scenario.

The display 106 may have a specified state based on a data transmit and receive state (e.g., a radio resource control (RRC) connected state) of the electronic device 100. For example, the display 106 may output a screen interface associated with transmitting and receiving data in a state where the corresponding data is transmitted and received via a base station. If the electronic device 100 is in a data communication waiting state (e.g., a state where the electronic device 100 camps on the base station or an RRC idle state), the display 106 may output a screen (e.g., a home screen or an idle screen) corresponding to the data communication waiting state. Alternatively, the display 106 may have a turn-off state in the data communication waiting state. Alternatively, the display 106 may have a turn-off state based on control in a data transmit and receive state.

The case 108 may cover at least part of the display 106 and may have at least one embedded component or element associated with operating the electronic device 100. For example, the case 108 may include the communication circuit 200 and the plurality of antennas 171 to 174. Alternatively, a battery, a camera, and the like may be received at one side of the case 108. The plurality of antennas 171 to 174 may be located at one side of the case 108. According to various embodiments of the present disclosure, at least one of the plurality of antennas 171 to 174 may be located on at least one of a plurality of places on an inner wall of the case 108 in the form of a pattern. According to an embodiment of the present disclosure, at least part of the case 108 may be made of metal materials. The case 108, the at least part of which is made of the metal materials, may be used as at least some of the plurality of antennas 171 to 174.

The plurality of antennas 171 to 174 may be located in a region of an inner side of the case 108 or may be formed as at least part of the case 108. According to an embodiment of the present disclosure, the plurality of antennas 171 to 174 may be located on a region of the case 108 of the rectangular electronic device 100 and may be spaced apart from each other at an interval. The plurality of antennas 171 to 174 may include upper antennas 173 and 174 and the lower antennas 171 and 172. The lower antennas 171 and 172 may be used as main antennas of the communication circuit 200. The upper antennas 173 and 174 may be used as diversity antennas of the communication circuit 200. The first upper antenna 173 between the upper antennas 173 may be located at a left upper side relative to a front surface on which the display 106 is seen, and the second upper antenna 174 between the upper antennas 173 and 174 may be located at a right upper side relative to the front surface. The first lower antenna 171 between the lower antennas 171 and 172 may be located at a left lower side relative to the front surface on which the display 106 is seen, and the second lower antenna 172 between the lower antennas 171 and 172 may be located at a right lower side relative to the front surface. Locations of the above-mentioned antennas 171 to 174 may be defined in a different way based on a location where the electronic device 100 is located.

According to various embodiments of the present disclosure, the first lower antenna 171 may include a main antenna having a length or volume mapped to correspond to a first available frequency or a type of a first network, which is being currently operated. At least one of the second lower antenna 172, the first upper antenna 173, or the second upper antenna 174 may be a sub-antenna which transmits and receives a signal of the first lower antenna 171. The first upper antenna 173 or the second upper antenna 174 may be a diversity antenna. According to various embodiments of the present disclosure, the first upper antenna 173 may include an antenna having a length or volume mapped to correspond to a second available frequency band or a second network type. The first upper antenna 173 may be a main antenna corresponding to the second available frequency band or the second network type. In this case, at least one of the second upper antenna 174, the first lower antenna 171, or the second lower antenna 172 may operate as a sub-antenna which helps transmit and receive a signal of the first upper antenna 173.

The switching module 190 (or switching circuit) may be located between the plurality of antennas 171 to 174 and the processor 160. The switching module 190 may include at least one switch. The switching module 190 may change, for example, a state where the first upper antenna 173, the first lower antenna 171, and the second lower antenna 172 are connected to the processor 160. According to an embodiment of the present disclosure, the switching module 190 may connect any one of the first upper antenna 173 or the first lower antenna 171 to the processor 160 in connection with outputting transmit data. Alternatively, the switching module 190 may connect any one of the first lower antenna 171 or the second lower antenna 172 to the processor 160 in connection with outputting transmit data. In FIG. 1, an embodiment is exemplified as the second upper antenna 174 is directly connected to the processor 160. However, various embodiments are not limited thereto. For example, the second upper antenna 174 may be connected to the processor 160 via the switching module 190.

The processor 160 may perform signaling associated with operating a communication service of the electronic device 100. In this regard, the processor 160 may include at least one of a radio frequency integrated chip (RFIC), a communication processor (CP), or an AP. The processor 160 may connect with at least one of the plurality of antennas 171 to 174 and may receive data transmitted from a base station. Alternatively, the processor 160 may transmit data based on at least one of the plurality of antennas 171 to 174. In this regard, the processor 160 may control a switching state of the switching module 190. According to an embodiment of the present disclosure, if the processor 160 includes an RFIC and a CP, the RFIC may receive or transmit data and the CP may control a switching state of the switching module 190. Alternatively, if the processor 160 is configured with an RFIC, the RFIC may transmit and receive data and may control the switching module 190.

In connection with transmitting data, the processor 160 may control a state of the switching module 190 associated with an antenna switching operation based on a wireless environment of the electronic device 100. According to an embodiment of the present disclosure, the processor 160 may determine whether an antenna switching operation is applied based on a level of a transmit power. For example, if the transmit power is less than a level, the processor 160 may transmit data over a designated antenna without performing an antenna switching operation. If the transmit power is greater than or equal to the level, the processor 160 may perform an antenna switching operation. For example, the processor 160 may determine (or verify) whether an antenna which is being currently operated has a good communication characteristic value of a specified level or more. If the antenna which is being currently operated has the good communication characteristic value of the specified level or more, the processor 160 may continue operating the antenna which is being currently operated. If the antenna which is being currently operated has a communication characteristic value of less than the specified level, the processor 160 may obtain a communication characteristic value of at least another antenna and may perform antenna switching based on the verified result. According to various embodiments of the present disclosure, if it is determined that an antenna switching operation is applied, the processor 160 may obtain a communication characteristic value of at least one of the plurality of antennas 171 to 174 and may control data transmission based on an antenna having a relative good communication characteristic value. In this regard, in case of an antenna which is in an active state, the processor 160 may obtain a communication characteristic value based on data received via the corresponding antenna. Alternatively, the processor 160 may temporarily activate a deactivated antenna among the plurality of antennas 171 to 174 to obtain a communication characteristic value and may perform a task of selecting an antenna, thus changing an antenna which is not selected to an inactive state.

According to various embodiments of the present disclosure, although the transmit power is less than a specific value, another transmit antenna rather than a designated antenna may be selected and operated. For example, as the transmit power is greater than or equal to the specific value, another antenna rather than a designated antenna (e.g., a main antenna) may be selected as a transmit antenna as an antenna switching function is applied. The transmit antenna may fail to be changed to the designated antenna since a condition is not met, and a transmit power may be reduced to less than the specific value. In this case, the processor 160 may end an antenna switching function. In this operation, the processor 160 may determines that the transmit power is reduced to less than the specific value while or before ending an antenna switching function and may change the transmit antenna to the main antenna to end the antenna switching function. Alternatively, if the transmit power is reduced to less than the specific value, the processor 160 may obtain information of a communication characteristic of the designated antenna while maintaining the switching function. In this operation, the processor 160 may wait until the communication characteristic of the designated antenna is greater than or equal to a specified reference value without ending the antenna switching function and may change the transmit antenna to the designated antenna if the communication characteristic of the specified antenna is greater than or equal to the specified reference value, thus ending the antenna switching function. According to various embodiments of the present disclosure, the processor 160 may end the antenna switching function in a state where a currently changed transmit antenna is maintained.

According to various embodiments of the present disclosure, the processor 160 may determine a data transmit and receive state and may apply an antenna switching operation policy in a different way based on the verified data transmit and receive state. For example, if the electronic device 100 is in a data receive state where it receives data from a base station, the processor 160 may collect a data frame during a time (e.g., a data frame received during 50 ms, herein, the time which may be changed based on a type of a network) over a communication channel (e.g., a physical downlink control channel (PDCCH) and a physical downlink shared channel (PDSCH)) which is being operated, in connection with data reception. If a communication characteristic value (e.g., a reference signal received power (RSRP)) of a collected reference signal is greater than or equal to a specified reference value, the processor 160 may maintain data transmission via an antenna which is being currently operated. The reference signal may include a cell-specific reference signal (CRS), a demodulation reference signal (DMRS), or the like.

If a communication characteristic value corresponding to an antenna which is being currently operated is less than the specified reference value, the processor 160 may collect a communication characteristic value of at least another antenna and may compare a difference between the communication characteristic value of the antenna which is being currently operated with the communication characteristic value of the other antenna. If the compared difference is greater than or equal to a specified reference value (e.g., if the communication characteristic value of the other antenna is better than that of the antenna which is being currently operated by the specified value or more), the processor 160 may select another antenna and may transmit data based on the selected other antenna. According to various embodiments of the present disclosure, the processor 160 may collect a communication characteristic value of the antenna which is being currently operated and communication characteristic values of other antennas at a specified period and may compare a difference between the communication characteristic value of the antenna which is being currently operated with the communication characteristic value of each of the other antennas. If the compared difference is greater than or equal to the specified reference value, the processor 160 may perform an antenna switching operation.

If the electronic device 100 is in a communication waiting state where it does not receive data from a base station (e.g., a state where the electronic device 100 camps on the base station), the processor 160 may control an antenna switching operation based on periodically received control data (e.g., a paging signal or data (e.g., the reference signal) transmitted over a pilot channel). In this operation, if it is difficult to determine a communication characteristic value based on an amount of control data received during one period, the processor 160 may accumulate control data collected during a specified period and may determine a communication characteristic value of an antenna. For example, the processor 160 may accumulate an amount of control data (e.g., the reference signal) received during a few periods and may determine a communication characteristic value of a corresponding antenna. The processor 160 may perform an antenna switching operation based on an antenna characteristic value or comparison of characteristic values of antennas. The reference signal may be continuously transmitted, included in a specific location of a data frame provided from a base station. If the electronic device 100 is in an RRC connected state, the processor 160 may continue measuring signal receive quality. If the electronic device 100 is in an RRC idle state, the processor 160 may measure signal receive quality based on a corresponding reference signal in response to a paging period. If there is data to be provided to the electronic device 100, the base station may transmit a PDCCH/PDSCH carrying corresponding control information and data. If the base station transmits the control information and the data over the above-mentioned channel, the processor 160 may measure signal receive quality over the corresponding channel.

The processor 160 may determine a state where the electronic device 100 is held and may perform an antenna switching operation based on the verified state. In this regard, the electronic device 100 may include at least one sensor (e.g., a grip sensor, a proximity sensor, or the like) which may detect if the specified portion is held. If collecting a signal according to sensing that the electronic device 100 is held, the processor 160 may perform an antenna switching operation based on the collected signal. In this operation, the processor 160 may limit a level of a transmit power based on a sensor signal transmitted from the proximity sensor. For example, if a proximity sensor signal corresponding to the approach of an object (e.g., a user body) is detected based on a specified condition (e.g., a surface adoption ratio (SAR) condition), the processor 160 may fix a maximum value of a transmit power at less than a level. According to various embodiments of the present disclosure, the processor 160 may change a transmit antenna to a specific antenna in response to detection of a proximity sensor signal. For example, although an upper antenna is selected as a transmit antenna due to an antenna switching operation, if the electronic device 100 is recognized as a specified state (e.g., a head-hand state), such as telephone call status due to the proximity sensor and the grip sensor, the processor 160 may change the upper antenna to a lower antenna to reduce physical damage by radio waves.

If detecting a proximity sensor signal corresponding to that the object (e.g., the user body) is distant from the electronic device 100, the processor 160 may change a maximum value of a transmit power to a level or more. For example, the processor 160 may adjust a maximum value of a transmit power to 22 dBm (e.g., if the object is close to a point of the electronic device 100), 22 dBm, 26 dBm (e.g., if the object is distant from the point of the electronic device 100 at a specified distance or more), and the like.

The processor 160 may obtain a type of a network according to a communication scenario currently performed and an available frequency band. The processor 160 may perform a communication function using a designated antenna based on the verified type of the network and the verified available frequency band. Alternatively, the processor 160 may determine a type of an antenna to be switched, based on the verified type of the network and the verified available frequency band. The processor 160 may collect a data receive characteristic value of at least one antenna (e.g., a received signal strength indication (RSSI) of an antenna in 2G communication, a reference signal code power (RSCP) of an antenna in 3G communication, a RSRP of an antenna in LTE communication) in connection with determining a communication characteristic of the at least one antenna.

According to various embodiments of the present disclosure, if the electronic device 100 supports a communication service according to a specific communication scenario (e.g., LTE), a plurality of antennas (e.g., the first lower antenna 171 and the first upper antenna 173) may be substantially and simultaneously operated. In this environment, if an antenna switching operation will be applied, the processor 160 may select an antenna, having a relatively good communication characteristic value among a plurality of antennas which are being currently operated, as a transmit antenna. If the selected antenna is a sub-antenna (e.g., an antenna which helps a main antenna (e.g., the first lower antenna 171) mapped to an available frequency band which is being currently operated, e.g., the first upper antenna 173, the second upper antenna 174, or the second lower antenna 172), the processor 160 may obtain a communication characteristic value of the main antenna based on a period. If the communication characteristic value of the main antenna is greater than or equal to a specified reference value or if a difference between a communication characteristic of the main antenna and a communication characteristic of the sub-antenna is greater than or equal to a specified reference value, the processor 160 may select the main antenna as a transmit antenna.

Figure 2:
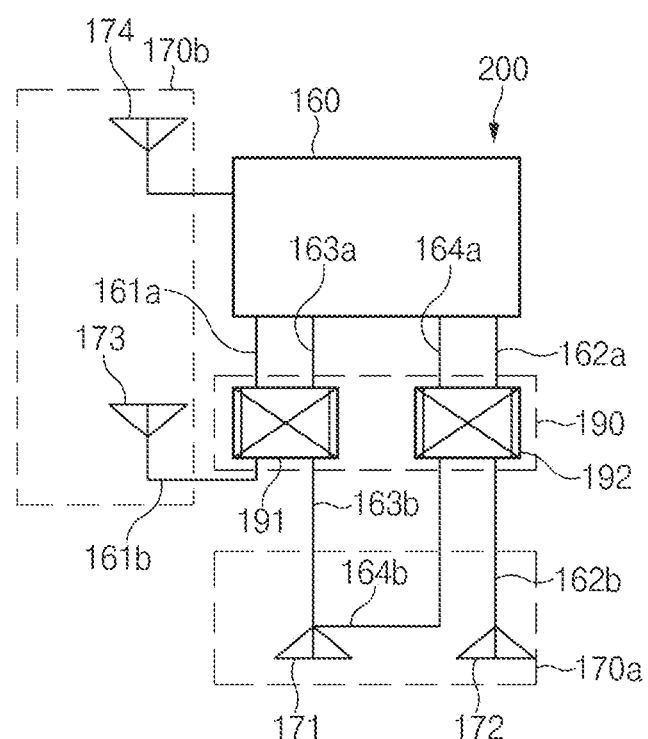
FIG. 2 illustrates a communication circuit and a plurality of antennas according to an embodiment of the present disclosure.

FIG. 2 illustrates a communication circuit and a plurality of antennas according to an embodiment of the present disclosure.

Referring to FIG. 2, a communication circuit 200 may include a processor 160 and a switching module 190. The switching module 190 may include a first switch 191 and a second switch 192. A plurality of antennas 170*a* and 170*b* may include lower antennas including a first lower antenna 171 and a second lower antenna 172 and upper antennas including a first upper antenna 173 and a second upper antenna 174.

The first switch 191 may change, for example, a state where the first upper antenna 173 and the first lower antenna 171 are connected to the processor 160. According to an embodiment of the present disclosure, the first switch 191 may connect the first lower antenna 171 to the processor 160 based on control of the processor 160 (e.g., a CP, an AP, or the like). Alternatively, the first switch 191 may connect the first upper antenna 173 to the processor 160 in response to control of the processor 160.

The second switch 192 may change, for example, a state where the first lower antenna 171 and the second lower antenna 172 are connected to the processor 160. According to an embodiment of the present disclosure, the second switch 192 may connect the first lower antenna 171 to the processor 160 based on control of the processor 160. Alternatively, the second switch 192 may connect the second lower antenna 172 to the processor 160 in response to control of the processor 160.

The communication circuit 200 may include a first switch signal line 161*a* which connects the processor 160 with the first switch 191 and a first antenna signal line 161*b* which connects the first switch 191 with the first upper antenna 173. The communication circuit 200 may include a second switch signal line 162*a* which connects the processor 160 with the second switch 192 and a second antenna signal line 162*b* which connects the second switch 192 with the second lower antenna 172. The communication circuit 200 may include a third switch signal line 163*a* which connects the processor 160 with the first switch 191 and a third antenna signal line 163*b* which connects the first switch 191 with the first lower antenna 171. The communication circuit 200 may include a fourth switch signal line 164*a* which connects the processor 160 with the second switch 192 and a fourth antenna signal line 164*b* which connects the second switch 192 with the first lower antenna 171.

In the above-mentioned description, an embodiment is exemplified as a structure in which the second upper antenna 174 is not connected with the switching module 190. However, various embodiments are not limited thereto. For example, the second upper antenna 174 may connect to the processor 160 via the switching module 190. The second upper antenna 174 may connect to the processor 160 in response to an operation of the second switch 192 (or the first switch 191).

If a first communication scenario associated with a first network type and a first available frequency band is selected, the processor 160 may select the first lower antenna 171 as a designated antenna and may select at least one of the first upper antenna 173 or the second lower antenna 172 as an antenna to be switched. Alternatively, if a second communication scenario associated with a second network type and a second available frequency band is selected, the processor 160 may select the first upper antenna 173 as a designated antenna and may select at least one of the first lower antenna 171 or the second lower antenna 172 as an antenna to be switched.

According to various embodiments of the present disclosure, if a type of a network or an available frequency band is changed, the processor 160 may operate an antenna matched to the changed type of the network or the changed available frequency band as a designated antenna. The processor 160 may perform an antenna switching operation in response to a change of a level of a transmit power. For example, the processor 160 may perform the first upper antenna 173 as a designated antenna, may perform a switching operation with the first lower antenna 171 located in a first direction from the first upper antenna 173 when an antenna switching operation is applied, or may perform a switching operation with the second upper antenna 174 located in a second direction from the first upper antenna 173.

According to various embodiments of the present disclosure, an electronic device may include a plurality of antennas and a communication circuit configured to electrically connect with the plurality of antennas. The communication circuit may be configured to transmit a signal based on a designated antenna if a level of a transmit power is less than a specified level and perform an antenna switching operation for selecting an antenna for signal transmission among the plurality of antennas if the level of the transmit power is greater than or equal to the specified level.

Alternatively, if the level of the transmit power is less than the specific level, the communication circuit may transmit a signal based on a specific antenna (e.g., an upper antenna). The communication circuit may control a change of a transmit antenna based on a change of the level of the transmit power or a change of a communication characteristic of a main antenna. For example, if the transmit power is reduced to less than a specific value, the communication circuit may change an antenna for transmission from a specific antenna to the main antenna before ending an antenna switching function of changing an antenna based on a transmission characteristic and may end the antenna switching function. Alternatively, if the transmit power is reduced to less than the specific value, a processor may obtain information of a communication characteristic of a designated antenna (e.g., a lower antenna) while maintaining an antenna switching function, may wait until the communication characteristic of the designated antenna is greater than or equal to a specified reference value, and may change an antenna for transmission from a specific antenna to the designated antenna if the communication characteristic of the designated antenna is greater than or equal to the specified reference value. According to various embodiments of the present disclosure, if a transmission characteristic is reduced to less than a specified reference value, the communication circuit may end the antenna switching function in a state where it maintains a currently changed transmit antenna.

According to an embodiment of the present disclosure, an electronic device may include a plurality of antennas and a communication circuit configured to electrically connect with at least one of the plurality of antennas, wherein the communication circuit is configured to obtain information of a level of a transmit power and transmit a signal based on a designated antenna among the plurality of antennas if the level of the transmit power is less than a level, determine an antenna for signal transmission among the plurality of antennas if the level of the transmit power is greater than or equal to the level, and perform an antenna switching operation of selecting the determined antenna.

According to various embodiments of the present disclosure, the communication circuit may be configured to perform an antenna switching operation between designated antennas based on a type of a network connected based on at least one of the plurality of antennas or an available frequency band.

According to various embodiments of the present disclosure, the communication circuit may be configured to select at least one designated antenna as a data transmit and receive antenna based on the type of the network or the available frequency band and perform a switching operation with an antenna spaced apart from the designated antenna at an interval in a first direction of the electronic device when performing the antenna switching operation, or perform a switching operation with an antenna spaced apart from the designated antenna at an interval in a second direction of the electronic device.

According to various embodiments of the present disclosure, the communication circuit may be configured to detect communication characteristic values of antennas, which are not being currently operated, at a period if a sub-antenna except for an antenna matched to the type of the network or the available frequency band is being currently operated and perform the antenna switching operation.

According to various embodiments of the present disclosure, the communication circuit may be configured to operate an antenna matched to the changed type of the network or the changed available frequency band as a designated antenna if the type of the network or the available frequency band is changed and perform the antenna switching operation based on the level of the transmit power.

According to various embodiments of the present disclosure, the communication circuit may include a processor and a switching module configured to connect the processor with at least one of the plurality of antennas and wherein the processor is configured to establish a communication path comprising the sub-antenna if detecting a sub-antenna having a communication characteristic value which is better than a communication characteristic value of a main antenna matched to a type of a network which is being currently operated or an available frequency band by a first level or more.

According to various embodiments of the present disclosure, the processor may be configured to, if detecting a main antenna having a communication characteristic value which is better than a communication characteristic value of the sub-antenna which is being currently operated by a second level or more, establish a communication path comprising the main antenna.

According to various embodiments of the present disclosure, the second level may be lower than the first level.

According to various embodiments of the present disclosure, the communication circuit may be configured to activate at least one antenna, which is in an inactive state, at an interval, collect a communication characteristic value of the activated antenna and deactivate antennas which are not selected after performing the antenna switching operation.

According to various embodiments of the present disclosure, the communication circuit may be configured to increase an interval at which a communication characteristic value associated with the antenna switching operation is collected, if a level of a communication characteristic value of an antenna which is being currently operated is greater than or equal to a level, if a difference between communication characteristic values of the plurality of antennas is greater than or equal to a setting value, or if the level of the transmit power is less than a level and decrease the interval at which the communication characteristic value associated with the antenna switching operation is collected, if the level of the communication characteristic value of the antenna which is being currently operated is less than the level, if the difference between the communication characteristic values of the plurality of antennas is less than the setting value, or if the level of the transmit power is greater than or equal to the level.

According to various embodiments of the present disclosure, the communication circuit may be configured to detect a communication characteristic value based on a data frame of an interval of a data communication channel, if the electronic device is in a data transmit and receive state when performing the antenna switching operation and detect a communication characteristic value based on control data received during a plurality of periods, if the electronic device is in a data communication waiting state.

Figure 3:
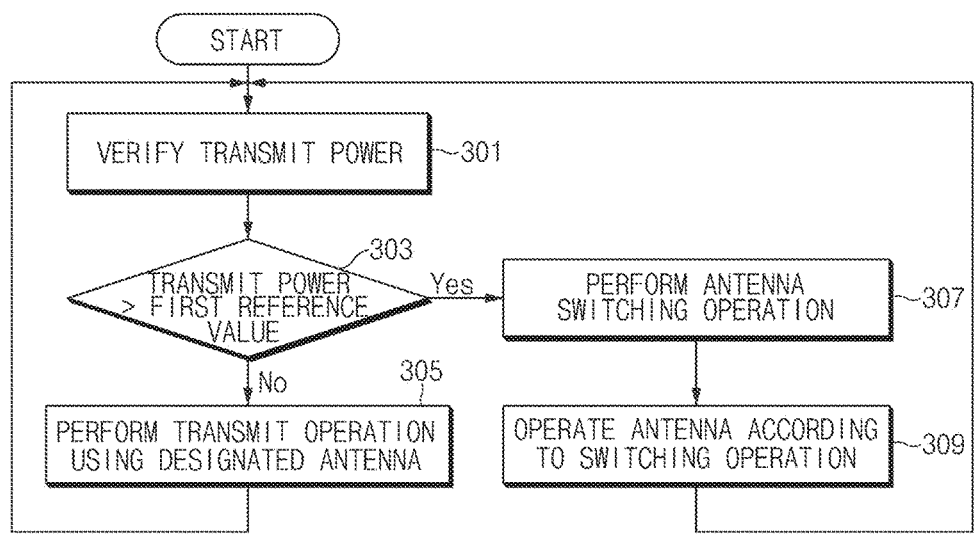
FIG. 3 is a flowchart illustrating a method for selecting a transmit antenna based on a transmit power according to an embodiment of the present disclosure.

FIG. 3 is a flowchart illustrating a method for selecting a transmit antenna based on a transmit power according to an embodiment of the present disclosure.

Referring to FIG. 3, in connection with the method for selecting the transmit antenna based on the transmit power according to an embodiment of the present disclosure, in operation 301, a processor 160 of FIG. 1 may determine a transmit power of an electronic device 100 of FIG. 1. For example, the processor 160 may collect a data transmit power via a specific antenna (or set to a default) selected in connection with a current network and an available frequency band. The data transmit power may rise by a request of a base station which establishes a communication channel (e.g., a request to change a transmit power of the electronic device 100 based on occurrence of an error of data transmitted from the electronic device 100). Alternatively, the data transmit power may be increased or decreased based on a wireless environment around the electronic device 100 relative to a value set to a default. For example, if the wireless environment around the electronic device 100 is relatively poor, a transmit power may be increased. If the wireless environment around the electronic device 100 is relatively good, the transmit power may be decreased. Herein, measurement of the wireless environment may be performed based on strength of a signal received from a base station, a state of the signal received from the base station, a request to change a transmit power from the base station, or the like. The processor 160 may transmit data based on an antenna selected by a default setting, a designated antenna, or an antenna selected through a previous antenna switching operation. The processor 160 may collect a data transmit power value of the designated antenna while transmitting data.

In operation 303, the processor 160 may determine whether the verified level of the transmit power is greater than or equal to a first specified reference value. If the verified level of the transmit power is less than the first specified reference value, in operation 305, the processor 160 may perform a transmit operation using a designated antenna (or an antenna which is being currently operated). Alternatively, the processor 160 may maintain data transmission and reception based on the designated antenna without performing an antenna switching operation. If a data transmit and receive operation based on the designated antenna is performed during a specified period of time, the processor 160 may branch to operation 301 to perform the operation again from operation 301. Alternatively, the processor 160 may maintain a transmit operation performed based on an antenna selected through a previously antenna switching operation.

If the verified level of the transmit power is greater than or equal to the first specified reference value, in operation 307, the processor 160 may perform an antenna switching operation. For example, if a transmit power used to transmit data based on a designated antenna is greater than or equal to the first reference value, the processor 160 may determine a current state as a state necessary for antenna switching. Thus, the processor 160 may collect a signal receive state value of at least another antenna including the designated antenna (e.g., an RSSI, an RSRP, an RSCP, and the like based on a communication scenario). The processor 160 may compare the collected signal receive value of the antenna with a signal receive value of the designated antenna to determine whether there is another good antenna (e.g., an antenna having a signal characteristic value or a communication characteristic value of a specified reference value or more). According to an embodiment of the present disclosure, the processor 160 may determine whether a value where a default value is subtracted from a value where a signal receive state value TH1 of a designated antenna is divided by a signal receive state value TH2 of another antenna is greater than or equal to a level (e.g., 6 dB) using Equation 1 below.

$$TH1/TH2-\text{default} \geq 6 \text{ dB or } 3 \text{ dB} \qquad \text{Equation 1}$$

Alternatively, according to various embodiments of the present disclosure, the processor 160 may determine whether a value where the signal receive state value TH2 of the other antenna is subtracted from the signal receive state value TH1 of the designated antenna is greater than or equal to a level (e.g., 6 dB or 3 dB).

$$TH1-TH2 \geq 6 \text{ dB or } 3 \text{ dB} \qquad \text{Equation 2}$$

In Equation 1 or 2 above, TH1 may represent the signal receive value of the designated antenna, and TH2 may represent the signal receive value of the other antenna. Alternatively, TH1 may be a signal receive value of a transmit antenna to be switched, and TH2 may be a signal receive value of an antenna which is being currently operated. The default may be a specific value in response to at least one of a type of the electronic device 100, a type of a network, or an available frequency band. The 6 dB or 3 dB may be changed based on a design condition. According to various embodiments of the present disclosure, in connection with an antenna switching operation, the processor 160 may operate a threshold value of determining an antenna switching operation in a different way based on a type of an antenna which is being currently operated. For example, if a main antenna (e.g., a lower antenna 171 of FIG. 1) is being currently operated and if a difference between a communication characteristic value of the main antenna and a communication characteristic value of another antenna is a first threshold value (e.g., if the other antenna is good by 6 dB or more), the processor 160 may perform an antenna switching operation. Alternatively, if a diversity antenna (e.g., a first upper antenna 173 of FIG. 1) is being currently operated and if a difference between a communication characteristic value of the diversity antenna with a communication characteristic value of the main antenna is greater than or equal to a second threshold value (e.g., if the main antenna is good by 3 dB or more), the processor 160 may perform the antenna switching operation. According to various embodiments of the present disclosure, the processor 160 may apply the same threshold value to a switching operation from the diversity antenna to the main antenna or a switching operation from the main antenna to the diversity antenna. Alternatively, the processor 160 may apply the same threshold value or another threshold value to a switching operation between the main antennas (e.g., the first lower antenna 171 and the second lower antenna 172 of FIG. 1). The threshold value applied to the switching operation between the main antennas may be different or the same as a threshold value applied to a switching operation between heterogeneous antennas (e.g., the diversity antenna and the main antenna).

According to various embodiments of the present disclosure, after determining an antenna switching operation, the processor 160 may perform the antenna switching operation in a different way based on a channel status (e.g., while data is transmitted or while data is not transmitted). For example, the processor 160 may determine a switching operation of a transmit antenna based on a signal characteristic value and may determine whether there is data to be currently transmitted. If data is being currently transmitted, the processor 160 may wait until a data transmit operation is ended. Thus, the processor 160 may prevent data loss which may occur based on switching of a transmit antenna. According to various embodiments of the present disclosure, if data is being transmitted, the processor 160 may wait during a specified time and may perform an antenna switching operation at an interval where there is no data transmission within the specified time. If data is being transmitted in a state where the specified time elapses, the processor 160 may stop transmitting data temporarily (e.g., by a time taken to perform antenna switching) and may perform an antenna switching operation. If the antenna switching operation is completed, the processor 160 may transmit data based on a switched antenna. According to various embodiments of the present disclosure, the processor 160 may perform an antenna switching operation during data transmission and may retransmit data lost while the antenna switching operation is performed. In this operation, if receiving a request to retransmit lost data from a base station, the processor 160 may transmit the corresponding data based on a changed antenna.

In the process of performing the above-mentioned operation, since the electronic device 100 is in a state where it operates a designated antenna, to collect a signal receive value of at least another antenna which is in an inactive state, the processor 160 may temporarily change the at least other antenna to an active state during a specified time. A measurement period may be between hundreds of milliseconds and a few seconds to minimize an increase in current consumption, and a measurement period of time may be within dozens of seconds.

After the antenna switching operation, in operation 309, the processor 160 may perform a data transmit or receive operation based on the switched antenna. After a specified time elapses, the processor 160 may branch to operation 301, may obtain a transmit power, and may perform an operation according to a level of the transmit power.

After the antenna switching operation is performed, a data transmit and receive operation performed based on the switched antenna may be changed based on a change in a wireless environment. For example, the processor 160 may collect a signal receive state value of a designated antenna at a specified period and may compare the collected signal receive state value of the designated antenna with a signal receive state value of the switched antenna. If the compared level is greater than or equal to a specified value (e.g., if the signal receive state value of the designated antenna is good by the specified level or more), the processor 160 may change a switching state to use the designated antenna.

According to various embodiments of the present disclosure, if the main antenna (e.g., the first lower antenna 171) is selected, the processor 160 may determine whether a level of a transmit power is greater than or equal to a specified reference value without performing an antenna switching operation. If the level of the transmit power is greater than or equal to the reference value, the processor 160 may perform the antenna switching operation. If the level of the transmit power is less than the specified level, the processor

160 may collect communication characteristic values of antennas for an antenna switching operation. According to various embodiments of the present disclosure, if a sub-antenna (e.g., the second lower antenna 172) spaced apart from the main antenna (e.g., the first lower antenna 171) at an interval in a first direction or a diversity antenna (e.g., the first upper antenna 173) spaced apart from the main antenna at an interval in a second direction is selected, the processor 160 may collect a communication characteristic value of the main antenna at an interval and may determine whether to perform antenna switching.

Figure 4:
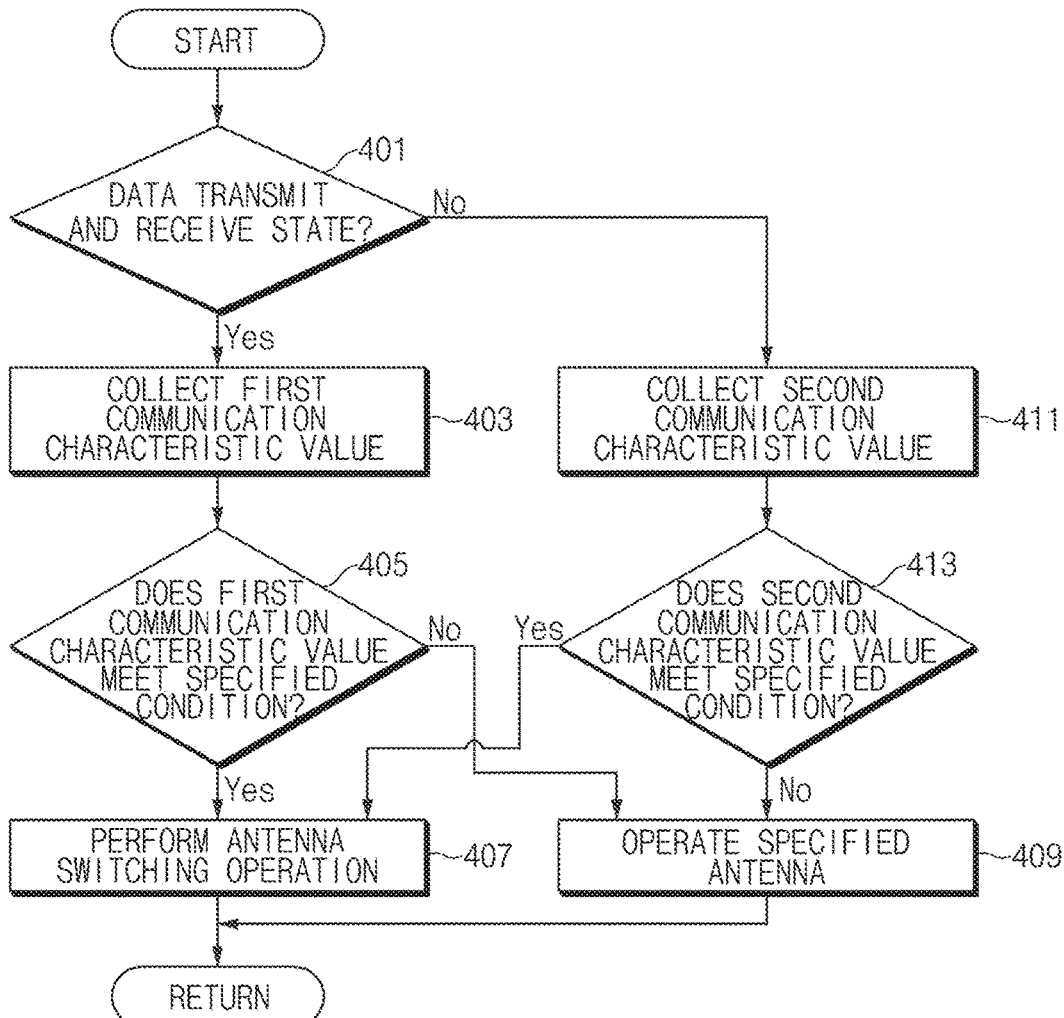
FIG. 4 is a flowchart illustrating a method for selecting a transmit antenna based on a communication state according to an embodiment of the present disclosure.

FIG. 4 is a flowchart illustrating a method for selecting a transmit antenna based on a communication state according to an embodiment of the present disclosure.

Referring to FIG. 4, in connection with the method for selecting the transmit antenna based on the communication state, in operation 401, a processor 160 of FIG. 1 may determine whether an electronic device 100 of FIG. 1 is in a data transmit and receive state. For example, the processor 160 may determine whether the electronic device 100 is in a data transmit and receive state where it currently establishes a communication channel with a base station, whether the electronic device 100 camps on the base station, or whether the electronic device 100 is in a state where it receives a control signal (e.g., a paging signal) over a control channel from the base station.

If the electronic device 100 is in the data transmit and receive state, in operation 403, the processor 160 may collect a first communication characteristic value of a data channel. According to an embodiment of the present disclosure, the processor 160 may collect part of data of a communication channel connected over an antenna which currently performs data transmission and reception. For example, the processor 160 may collect an RSSI, an RSRP, an RSCP, or the like from data (e.g., a CRS) received during a time range within dozens of milliseconds based on a communication mode. Alternatively, the processor 160 may temporarily activate at least one antenna of an inactive state among a plurality of antennas and may receive data via the activated antenna. The processor 160 may collect a communication characteristic value of the corresponding antenna based on the data received via the activated antenna.

In operation 405, the processor 160 may determine whether a first communication characteristic value obtained in a first mode meets a specified condition. The first communication characteristic value obtained in the first mode may include, for example, a communication characteristic value (e.g., an RSRP) calculated based on a specified reference signal (e.g., a CRS) obtained during a first specified time (e.g., 5 ms) via an antenna in a state (e.g., an RRC connected state) activated for data transmission and reception. The processor 160 may determine whether the first communication characteristic value indicating a wireless signal environment is less than a specified reference value. If the first communication characteristic value meets the specified condition, in operation 407, the processor 160 may perform an antenna switching operation. After the antenna switching operation, the processor 160 may perform a scheduled function based on the switched antenna. For example, the processor 160 may transmit and receive data based on the switched antenna.

If the first communication characteristic value does not meet the specified condition, in operation 409, the processor 160 may operate a designated antenna. For example, if the first communication characteristic value indicates a state where the electronic device 100 is good to perform wireless communication, the processor 160 may perform data communication (e.g., data transmission) based on a designated antenna (or a previously used antenna).

If the electronic device 100 is not the data transmit and receive data in operation 401, in operation 411, the processor 160 may collect a second communication characteristic value of a second mode. The second communication characteristic value of the second mode may include, for example, a communication characteristic value (e.g., an RSRP) calculated based on a specified reference signal (e.g., a CRS) obtained a specified number or more of times (e.g., 3 times, 10 times, and the like) during a second specified time (e.g., 1 ms) via an antenna in a data communication waiting state (e.g., an RRC idle state). The reference signal may be obtained through a paging signal (e.g., 1 ms) received during a specified period (e.g., 1.28 s) over a control channel if the electronic device 100 is in a communication waiting state. In a communication waiting state after the electronic device 100 registers with a base station, the processor 160 may receive control data over a control channel established with the base station at an interval. The control data may include, for example, a paging signal received over a paging channel of the electronic device 100. The processor 160 may collect the second communication characteristic value based on the received control data. The second communication characteristic value may include a wireless signal characteristic value of an antenna used to receive a paging signal. For example, the second communication characteristic value may include an RSSI, an RSRP, an RSCP, or the like of an antenna associated with a paging signal. According to an embodiment of the present disclosure, the processor 160 may accumulate control data during a specified period and may collect the second communication characteristic value based on the accumulated control data. For example, the processor 160 may detect a second communication characteristic value of an antenna based on control data received during a few periods via the corresponding antenna associated with receiving a paging signal.

In operation 413, the processor 160 may determine whether the second communication characteristic value meets the specified condition. If the second communication characteristic value meets the specified condition, for example, if the second communication characteristic value associated with an antenna which is being currently used is relatively poor (or if the second communication characteristic value is less than a specified reference value), in operation 407, the processor 160 may perform an antenna switching operation. After the antenna switching operation, the processor 160 may wait for communication using the switched antenna. Alternatively, the processor 160 may transmit a specified signal to a base station using the switched antenna. For example, the processor 160 may transmit a response signal corresponding to reception of control data using the switched antenna.

If the second communication characteristic value does not meet the specified condition, in operation 409, the processor 160 may operate a designated antenna. In this operation, the processor 160 may wait for communication using the designated antenna.

The processor 160 may transmit and receive data or may wait for communication (or transmit a specified response signal) during a specified period using a determined antenna (e.g., a switched antenna or a designated antenna) and may perform a return operation of branching to operation 401 and performing the operation again from operation 401.

Figure 5A:
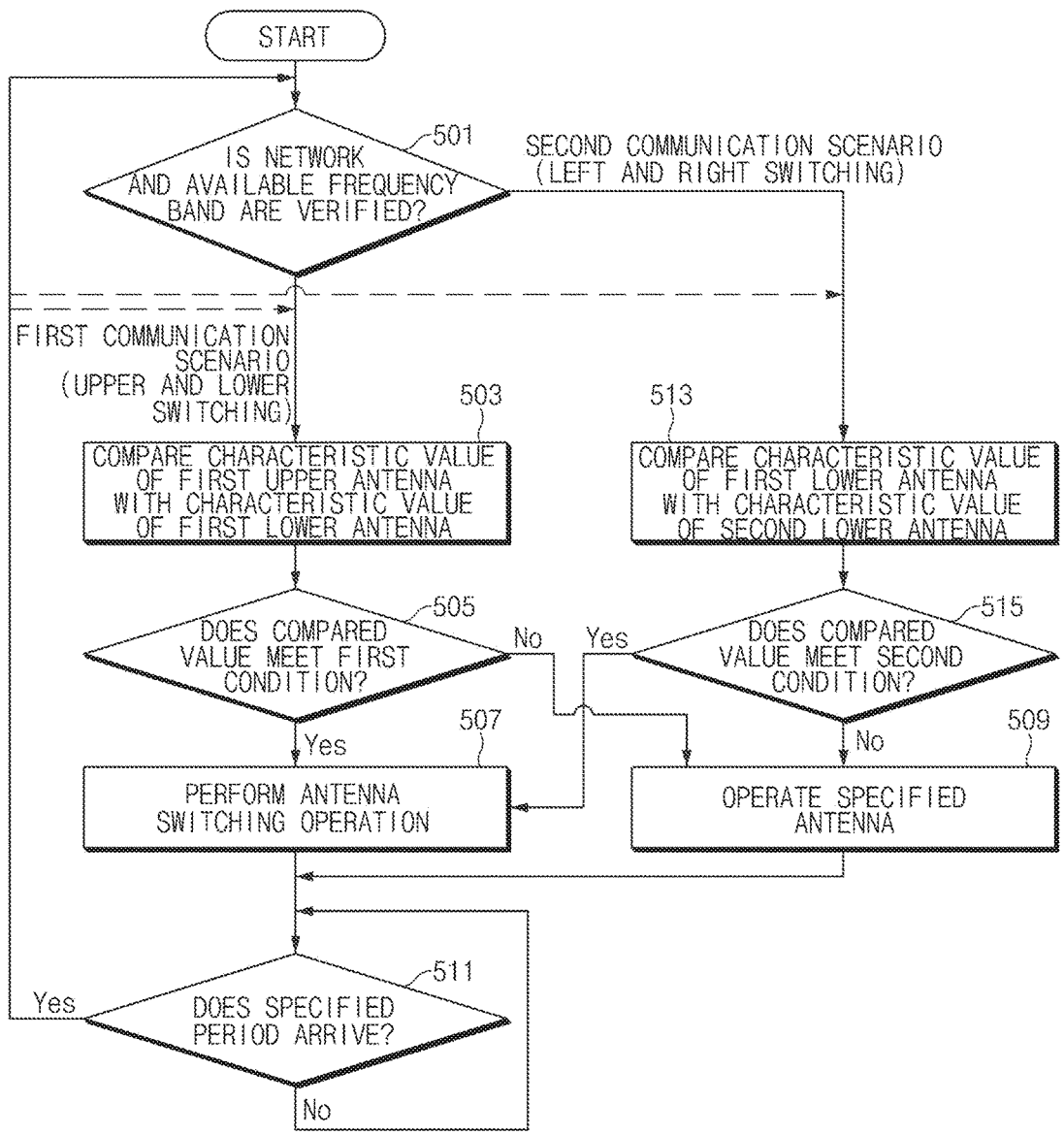
FIG. 5A is a flowchart illustrating a method for selecting a transmit antenna based on antennas of specified locations according to an embodiment of the present disclosure.

FIG. 5A is a flowchart illustrating a method for selecting a transmit antenna based on antennas of specified locations according to an embodiment of the present disclosure.

Referring to FIG. 5A, in connection with the method for selecting the transmit antenna based on the antennas of the specified locations, in operation 501, a processor 160 of FIG. 1 may obtain a network and an available frequency band. In this regard, the processor 160 may obtain the network and the available frequency band written in a specified memory or a memory associated with a communication function. Alternatively, the processor 160 may obtain information of a communication scenario (or a communication mode) selected by an input signal or a communication scenario selected by specified scheduling.

If configured to perform communication according to a first communication scenario which uses a network of a first type and a first available frequency band, in operation 503, the processor 160 may compare a characteristic value of a first upper antenna 173 of FIG. 1 with a characteristic value of a first lower antenna 171 of FIG. 1. The network of the first type and the first available frequency band may be determined in response to a communication scenario selected by a user of an electronic device 100 of FIG. 1 or selected by settings of the electronic device 100. The first communication scenario may be, for example, a 2G, 3G, or LTE communication mode. Alternatively, the first communication scenario may be a first-type Wi-Fi communication mode (e.g., a mode using 2.4 GHz) or a second-type Wi-Fi communication mode (e.g., a mode using 5 GHz). The processor 160 may operate a specific antenna, for example, the first lower antenna 171 as a designated antenna based on the network of the first type and the first available frequency band. In this case, the processor 160 may temporarily activate the first upper antenna 173 in connection with collecting a communication characteristic value of the first upper antenna 173 and may collect the communication characteristic value. The processor 160 may compare a communication characteristic value (e.g., a wireless signal receive characteristic value) of the first upper antenna 173 with a communication characteristic value (e.g., a wireless signal receive characteristic value) of the first lower antenna 171 which is being previously operated.

In operation 505, the processor 160 may determine whether the compared value meets a first condition. The first condition may include a condition necessary for an antenna switching operation. For example, the first condition may include a condition of determining whether the first lower antenna 171 is in a poor state since a communication characteristic of the first lower antenna 171 associated with data transmission is of a relatively specified value or less as compared with a communication characteristic of the first upper antenna 173.

If the compared value meets the first condition, in operation 507, the processor 160 may perform an antenna switching operation. For example, the processor 160 may switch the first lower antenna 171 (or the first upper antenna 173) which is being used in connection with data transmission to the first upper antenna 173 (or the first lower antenna 171). In connection with this operation, the processor 160 may change a switch state of a switching module 190 of FIG. 1 based on a change in a wireless environment. For example, the processor 160 may control the switching module 190 to establish a communication path with the first lower antenna 171. If requested to perform an antenna switching operation, the processor 160 may control the switching module 190 to establish a communication path with the first upper antenna 173.

If the compared value does not meet the first condition, in operation 509, the processor 160 may operate a designated antenna. For example, the processor 160 may transmit data using the set first lower antenna 171.

In operation 501, if configured to perform communication through a second communication scenario based on a network of a second type and a second available frequency band, in operation 513, the processor 160 may compare a characteristic value of the first lower antenna 171 with a characteristic value of a second lower antenna 172 of FIG. 1. According to an embodiment of the present disclosure, the processor 160 may substantially and simultaneously operate the first upper antenna 173 and the first lower antenna 171 as receive antennas based on a selected communication scenario and may operate the first lower antenna 171 as a transmit antenna. In this case, the processor 160 may collect a communication characteristic value (e.g., a wireless signal receive characteristic value) of the first lower antenna 171 based on data received via the first lower antenna 171 and may collect a communication characteristic value (e.g., a wireless signal receive characteristic value) of the second lower antenna 172 based on data received via the second lower antenna 172, thus comparing the communication characteristic value of the first lower antenna 171 with the communication characteristic value of the second lower antenna 172. The processor 160 may temporarily activate the second lower antenna 172 which is in an inactivate state and may collect a communication characteristic value of the second lower antenna 172. According to various embodiments of the present disclosure, if an input event according to the holding of the electronic device 100 is generated from a grip sensor included in the electronic device 100, the processor 160 may collect a communication characteristic value of the second lower antenna 172. Alternatively, if a communication characteristic value of the first lower antenna 171 is reduced to less than a specified reference value, the processor 160 may collect a communication characteristic value of the second lower antenna 172. Alternatively, if a transmit power used to transmit data via the first lower antenna 171 is greater than or equal to a specified value, the processor 160 may collect a communication characteristic value of the second lower antenna 172. The processor 160 may compare the collected communication characteristic value of the second lower antenna 172 with the collected communication characteristic value of the first lower antenna 171.

If it is determined in operation 515 that the compared value meets a second condition, the processor 160 may perform an antenna switching operation in operation 507. The second condition may include a condition of detecting a state where a wireless environment is relatively poor since a difference between a communication characteristic value of the first lower antenna 171 and a communication characteristic value of the second lower antenna 172 is less than a specified level.

If the compared value does not meet the second condition, in operation 509, the processor 160 may operate the designated antenna. For example, if the first lower antenna 171 is relatively better than the second lower antenna 172 (or if the first lower antenna 171 has a good communication characteristic value by a specified level or more), the processor 160 may transmit data via a previously operated antenna (e.g., the first lower antenna 171).

In operation 511, the processor 160 may determine whether a specified period arrives. If the specified period arrives, the processor 160 may branch to operation 501 to perform the operation again from operation 501. Alternatively, if the specified period arrives, the processor 160 may branch to operation 503 or 513 based on a set communication scenario to perform the operation again from operation 503 or 513.

Figure 5B:
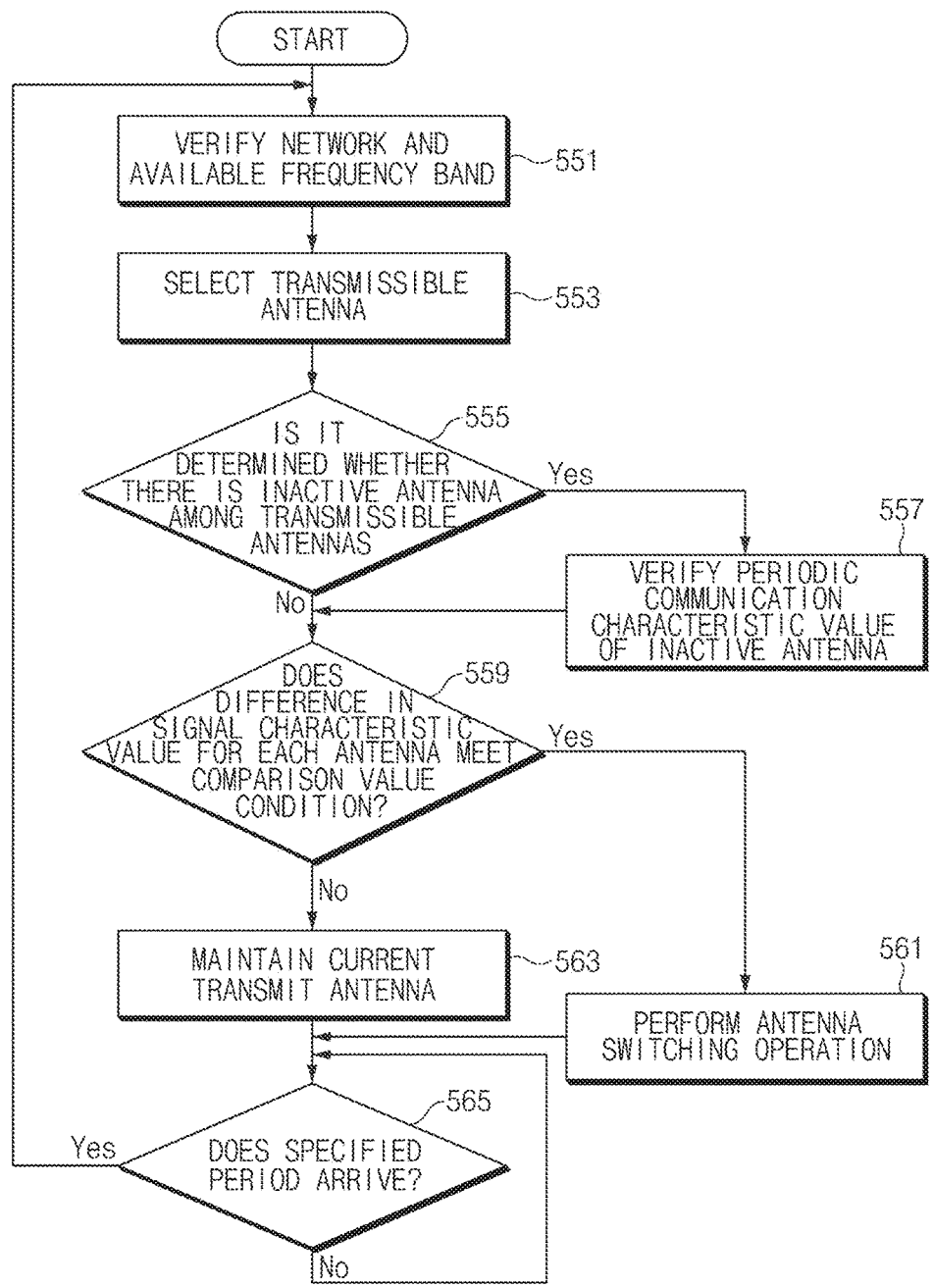
FIG. 5B is a flowchart illustrating a method for selecting a transmit antenna according to an embodiment of the present disclosure.

FIG. 5B is a flowchart illustrating a method for selecting a transmit antenna according to an embodiment of the present disclosure.

Referring to FIG. 5B, in connection with the method for selecting the transmit antenna, in operation 551, a processor 160 of FIG. 1 may obtain information of a network and an available frequency band. In this regard, the processor 160 may obtain information of the network and the available frequency band written in a specified memory or a memory associated with a communication function. Alternatively, the processor 160 may obtain information of a communication scenario (or a communication mode) selected by an input signal or a communication scenario selected by specified scheduling.

If the network and the available frequency band are verified, in operation 553, the processor 160 may select a transmissible antenna group corresponding to the verified network and available frequency band. The transmissible antenna group may include a plurality of antennas mapped in response to the network and the available frequency band. For example, the transmissible antenna group may include a variety of groups, such as an upper left and right antenna group, a lower left and right antenna group, an upper and lower left antenna group, an upper and lower right antenna group.

In operation 555, the processor 160 may determine whether there is an antenna of an inactive state in the transmissible antenna group. If there is the antenna of the inactive state, in operation 557, the processor 160 may obtain a periodic communication characteristic value of the antenna of the inactive state. If collecting all of communication characteristic values of antennas included in the transmissible antenna group, in operation 559, the processor 160 may determine whether a difference in characteristic value for each antenna meets a specified comparison value condition.

If the difference in characteristic value meets the specified comparison value condition, in operation 561, the processor 160 may perform an antenna switching operation. For example, if a communication characteristic value of a transmit antenna which is not selected is better than a communication characteristic value of an antenna which is being currently operated by a relatively specified condition or more, the processor 160 may perform the antenna switching operation.

If the difference in characteristic value does not meet the comparison value condition, in operation 563, the processor 160 may maintain a current transmit antenna. For example, if the current transmit antenna has relative higher efficiency than another antenna, the processor 160 may maintain the current transmit antenna.

In operation 565, the processor 160 may determine whether a specified period arrives. If the specified period arrives, the processor 160 may branch to operation 551 to perform the operation again from operation 551.

Figure 6:
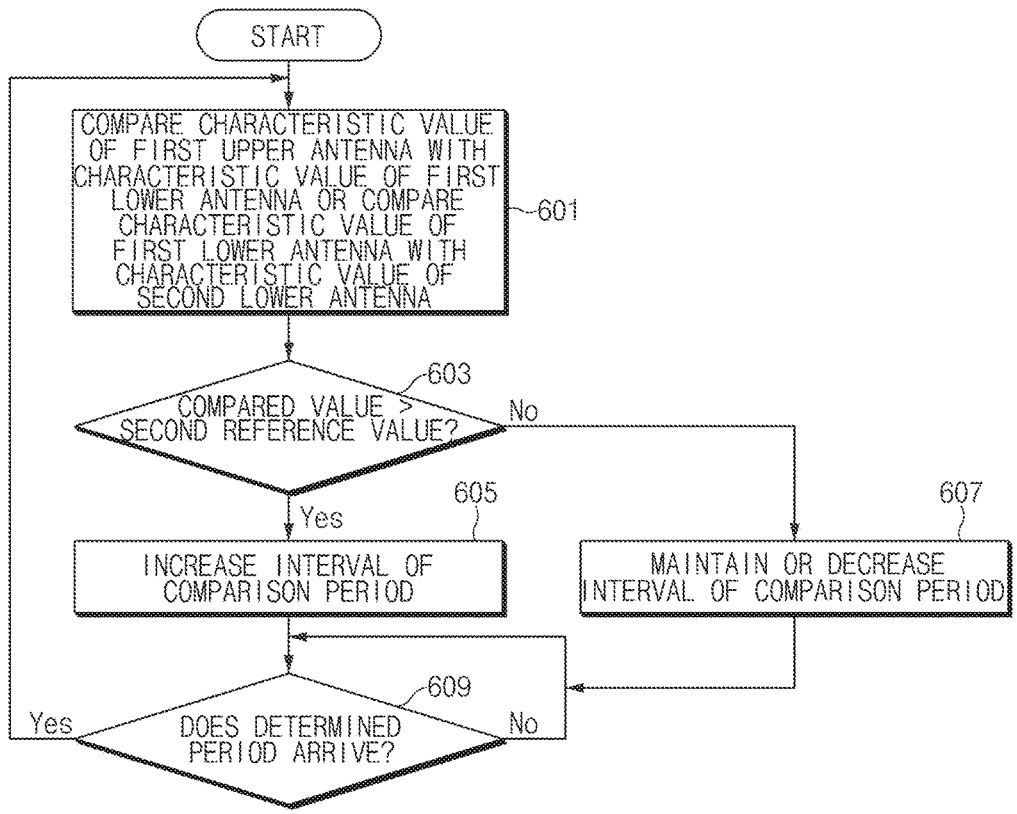
FIG. 6 is a flowchart illustrating a method for changing a period associated with switching a transmit antenna according to an embodiment of the present disclosure.

FIG. 6 is a flowchart illustrating a method for changing a period associated with switching a transmit antenna according to an embodiment of the present disclosure.

Referring to FIG. 6, in connection with the method for changing the period, in operation 601, a processor 160 of FIG. 1 may compare a characteristic value of a first upper antenna 173 of FIG. 1 with a characteristic value of a first lower antenna 171 of FIG. 1 or may compare the characteristic value of the first lower antenna 171 with a characteristic value of a second lower antenna 172 of FIG. 1. Alternatively, the processor 160 may compare the characteristic value of the first upper antenna 173 with a characteristic value of a second upper antenna 174 of FIG. 1. A characteristic for each location of each of the above-mentioned antennas may be changed based on a type of a network and a type of an available frequency band. For example, if configured to operate a first communication scenario, the processor 160 may operate the first lower antenna 171 as a designated antenna associated with data transmission and reception. The designated antenna may include, for example, an antenna selected by a default setting in connection with operating a communication function according to a set communication scenario. In connection with an antenna switching operation, the processor 160 may activate the first upper antenna 173 at a period and may collect a communication characteristic value. According to various embodiments of the present disclosure, if configured to operate a second communication scenario, the processor 160 may operate the first lower antenna 171 and the first upper antenna 173 as designated antennas associated with data reception and may operate the first lower antenna 171 as a designated antenna associated with data transmission. In this operation, the processor 160 may collect a communication characteristic value of the second lower antenna 172 at a period.

In operation 603, the processor 160 may determine whether the compared value is greater than a second specified reference value. The second reference value may include, for example, a threshold value determined to perform an antenna switching operation. If the compared value is greater than the second specified reference value, the processor 160 may perform a data transmit and receive operation based on an antenna selected by a default setting or a previously selected antenna without performing an antenna switching operation.

If the compared value is greater than the second specified reference value, in operation 605, the processor 160 may increase an interval of a comparison period. If the compared value is less than or equal to the second specified reference value, in operation 607, the processor 160 may maintain or reduce the interval of the comparison period. In this operation, if the compared value is less than or equal to the second specified reference value, the processor 160 may perform an antenna switching operation.

In operation 609, the processor 160 may determine whether the determined period arrives. If the determined period arrives, the processor 160 may branch to operation 601 to perform the operation again from operation 601.

In performing the above-mentioned operation, the processor 160 may adjust an interval of the comparison period relative to a minimum value and a maximum value of the comparison period. For example, although an antenna switching operation is not performed, the processor 160 may compare communication characteristics of antennas at a specified maximum value period. According to various embodiments of the present disclosure, the processor 160 may change a time interval size of the comparison period based on a type of an antenna which is being currently operated. For example, the processor 160 may set an interval of a comparison period for a main antenna (e.g., the first lower antenna 171) to be relatively broader. Alternatively, the processor 160 may set an interval of a comparison period for a diversity antenna (e.g., the first upper antenna 173) to be relatively broader. Thus, if an antenna which is being currently operated is the first upper antenna 173, the processor 160 may compare communication characteristic values of antennas at a relatively shorter period than a situation where the first lower antenna 171 is being operated. According to various embodiments of the present disclosure, a maximum or minimum value of the comparison period interval of the first lower antenna 171 may differ from a maximum or minimum value of the comparison period interval of the first upper antenna 173. Alternatively, the maximum or minimum value of the comparison period interval of the first lower antenna 171 may be the same as the maximum or minimum value of the comparison period interval of the first upper antenna 173. A change value of the comparison period interval of the first lower antenna 171 may differ from a change value of the comparison period interval of the first upper antenna 173. For example, a size change value of the comparison period interval of the first lower antenna 171 is larger than a size change value of the comparison period interval of the first upper antenna 173. Thus, if the first lower antenna 171 is an antenna which is being currently operated, although it has the same comparison period as the first upper antenna 173 is being currently operated, an arrival time of a maximum value (e.g., a period value of relatively faster or the fastest arrival of a time when a next communication characteristic value is compared) may be faster.

According to various embodiments of the present disclosure, the processor 160 may adjust a comparison period of a communication characteristic value for an antenna switching operation based on a change of a transmit power. For example, if the transmit power is a first level, the processor 160 may determine the comparison period of the communication characteristic value for the antenna switching operation as a first period. If the transmit power is a second level (e.g., the second level which is higher than the first level), the processor 160 may determine the comparison period of the communication characteristic value for the antenna switching operation as a second period (e.g., a period of a broader interval than that of the first period).

According to an embodiment of the present disclosure, a method for selecting a transmit antenna may include selecting and operating antennas of one group corresponding to a type of a network and an available frequency band among a plurality of antennas, obtaining information of a level of a transmit power of the selected antenna used for data transmission among the plurality of antennas and performing signal transmission based on the selected antenna if the level of the transmit power of the selected antenna used for data transmission among the plurality of antennas is less than a level and selecting an antenna for signal transmission among the plurality of antennas if the level of the transmit power is greater than or equal to the level.

According to various embodiments of the present disclosure, the selecting of the antenna may include performing a switching operation with an antenna spaced apart from a designated antenna at an interval in a first direction of an electronic device, when an antenna switching operation is performed or performing a switching operation with an antenna spaced apart from the designated antenna at an interval in a second direction of the electronic device.

According to various embodiments of the present disclosure, the selecting of the antenna may include detecting communication characteristic values of antennas, which are not being currently operated, at a period if a sub-antenna except for an antenna matched to the type of the network or the available frequency band is being currently operated and performing antenna switching.

According to various embodiments of the present disclosure, the selecting of the antenna may include, if the type of the network or the available frequency band is changed, operating an antenna matched to the changed type of the network or the changed available frequency band as a designated antenna and performing antenna switching based on the level of the transmit power.

According to various embodiments of the present disclosure, the selecting of the antenna may include, if a sub-antenna having a communication characteristic value which is better than a communication characteristic value of a main antenna matched to a type of a network which is being currently operated or an available frequency band by a first level or more is detected, establishing a communication path comprising the sub-antenna.

According to various embodiments of the present disclosure, the selecting of the antenna may include, if the main antenna having a communication characteristic value which is better than a communication characteristic value of the sub-antenna which is being currently operated by a second level or more, establishing a communication path comprising the main antenna.

According to various embodiments of the present disclosure, the selecting of the antenna may include activating at least one antenna, which is in an inactive state, at an interval and collecting a communication characteristic value of the activated antenna and deactivating antennas which are not selected after an antenna switching operation is performed.

According to various embodiments of the present disclosure, the method may include increasing an interval at which a communication characteristic value associated with an antenna switching operation is collected, if a level of a communication characteristic value of an antenna which is being currently operated is greater than or equal to a level, if a difference between communication characteristic values of the plurality of antennas is greater than or equal to a setting value, or if the level of the transmit power is less than a level and decreasing the interval at which the communication characteristic value associated with the antenna switching operation is collected, if the level of the communication characteristic value of the antenna which is being currently operated is less than the level, if the difference between the communication characteristic values of the plurality of antennas is less than the setting value, or if the level of the transmit power is greater than or equal to the level.

According to various embodiments of the present disclosure, the selecting of the antenna may include detecting a communication characteristic value based on a data frame of an interval of a data communication channel, if an electronic device is in a data transmit and receive state when an antenna switching operation is performed and detecting a communication characteristic value based on control data received during a plurality of periods, if the electronic device is in a data communication waiting state.

Figure 7:
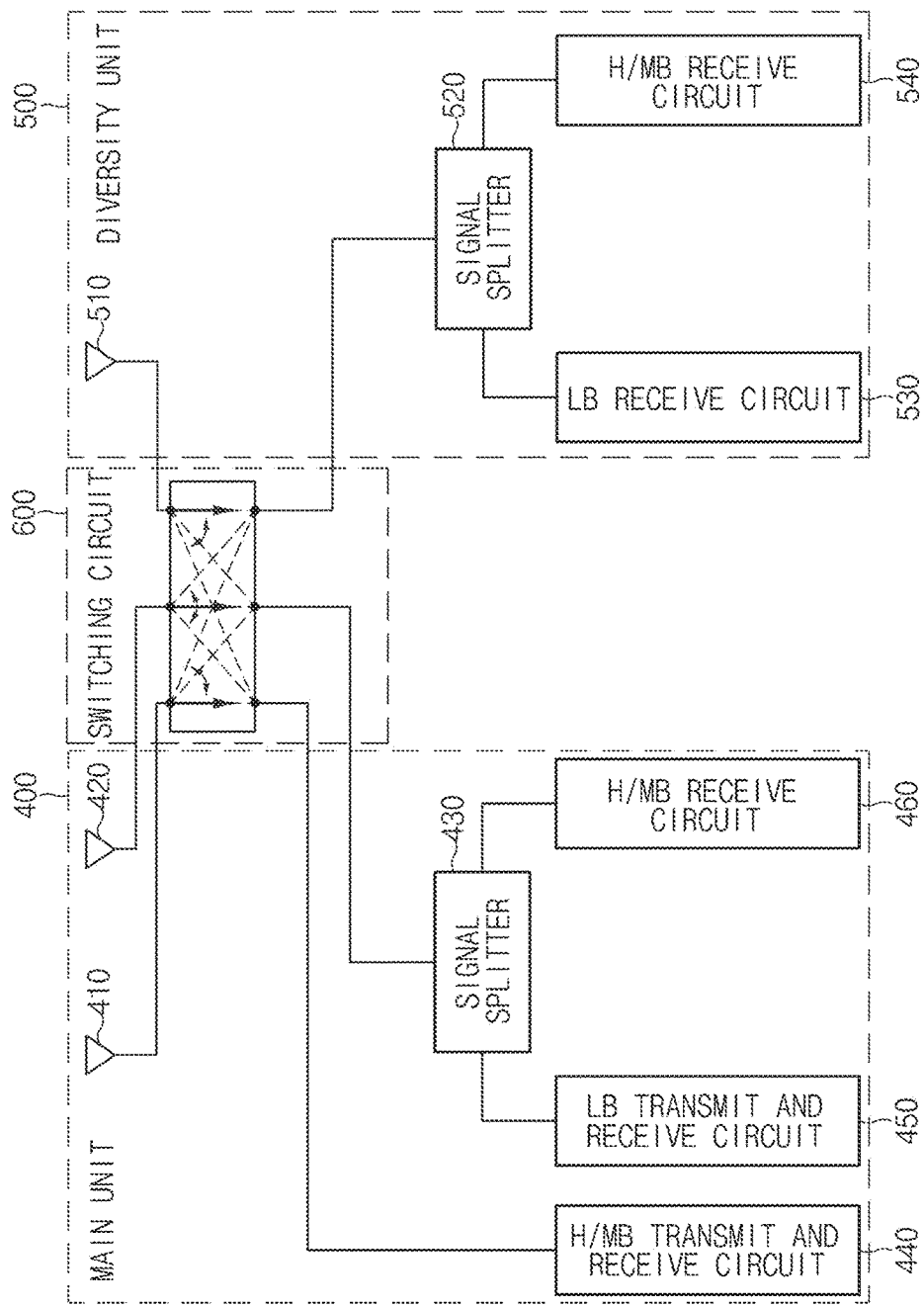
FIG. 7 is a block diagram illustrating an antenna and a radio frequency (RF) circuit included in an electronic device according to an embodiment of the present disclosure.

FIG. 7 is a block diagram illustrating an antenna and a radio frequency (RF) circuit included in an electronic device according to an embodiment of the present disclosure.

Referring to FIG. 7, the electronic device may include a main unit 400, a diversity unit 500, and a switching circuit 600.

The electronic device according to an embodiment may simultaneously receive a high-band (HB) signal and a middle-band (MB) signal via three antennas. For example, each of signals received by a first antenna 410, a second antenna 420, and a third antenna 510 may be transmitted to an H/MB transmit and receive circuit 440, a signal splitter 430, or a signal splitter 520 via the switching circuit 600 based on a band of the corresponding signal. The signal splitter 430 may transmit the transmitted signal to a low-band (LB) transmit and receive circuit 450 or an H/MB receive circuit 460 based on a band of the signal. The signal splitter 520 may transmit the transmitted signal to an LB receive circuit 530 or an H/MB receive circuit 540 based on a band of the signal.

According to various embodiments of the present disclosure, the switching circuit 600 may change a connection between the first antenna 410, the second antenna 420, and the third antenna 510 and a communication circuit. The switching circuit 600 may electrically connect, for example, the first antenna 410 with the H/MB transmit and receive circuit 440, the signal splitter 430, or the signal splitter 520. The switching circuit 600 may electrically connect, for example, the second antenna 420 with a component which is not connected with the first antenna 410 among the H/MB transmit and receive circuit 440, the signal splitter 430, or the signal splitter 520. The switching circuit 600 may electrically connect, for example, the third antenna 510 with a component which is not connected with the first antenna 410 and the second antenna 420 among the H/MB transmit and receive circuit 440, the signal splitter 430, or the signal splitter 520. An operation of the switching circuit 600 may be controlled by, for example, a control circuit and a transceiver (or a CP).

The H/MB transmit and receive circuit 440, the LB transmit and receive circuit 450, and the H/MB receive circuit 460 may be included in a first communication circuit included in the main unit 400. As another example, the LB receive circuit 530 and the H/MB receive circuit 540 may be in a second communication circuit included in the diversity unit 500. The communication circuit may simultaneously receive an HB signal and/or an MB signal via a plurality of antennas included in the electronic device. For example, if an HB and/or MB signal is received by the first antenna 410, the second antenna 420, and the third antenna 510, the switching circuit 600, the signal splitter 430, and the signal splitter 520 may operate such that the signals received by the first antenna 410, the second antenna 420, and the third antenna 510 are transmitted the H/MB transmit and receive circuit 440, the H/MB receive circuit 460, and the H/MB receive circuit 540. If the first antenna 410, the second antenna 420, and the third antenna 510 are respectively connected with the H/MB transmit and receive circuit 440, the H/MB receive circuit 460, and the H/MB receive circuit 540, the communication circuit may be configured to simultaneously receive at least part of an HB signal and/or an MB signal received by the first antenna 410, the second antenna 420, and the third antenna 510 using the H/MB transmit and receive circuit 440, the H/MB receive circuit 460, and the H/MB receive circuit 540.

According to an embodiment of the present disclosure, a transmit signal generated by the H/MB transmit and receive circuit 440 may be transmitted using any one of a main antenna (e.g., the first antenna 410) and a sub-antenna (e.g., the second antenna 420 and the third antenna 510). In this regard, the communication circuit may perform an antenna switching operation associated with the first antenna 410, the second antenna 420, and the third antenna 510 based on a level of a transmit power, whether the electronic device is held, and the like. In this operation, the communication circuit may perform an antenna switching operation between designated antennas based on a type of a network and an available frequency band. For example, the communication circuit may perform an antenna switching operation between the first antenna 410 and the second antenna 420 or an antenna switching operation between the first antenna 410 and the third antenna 510, based on a type of a network and an available frequency band.

Figure 8:
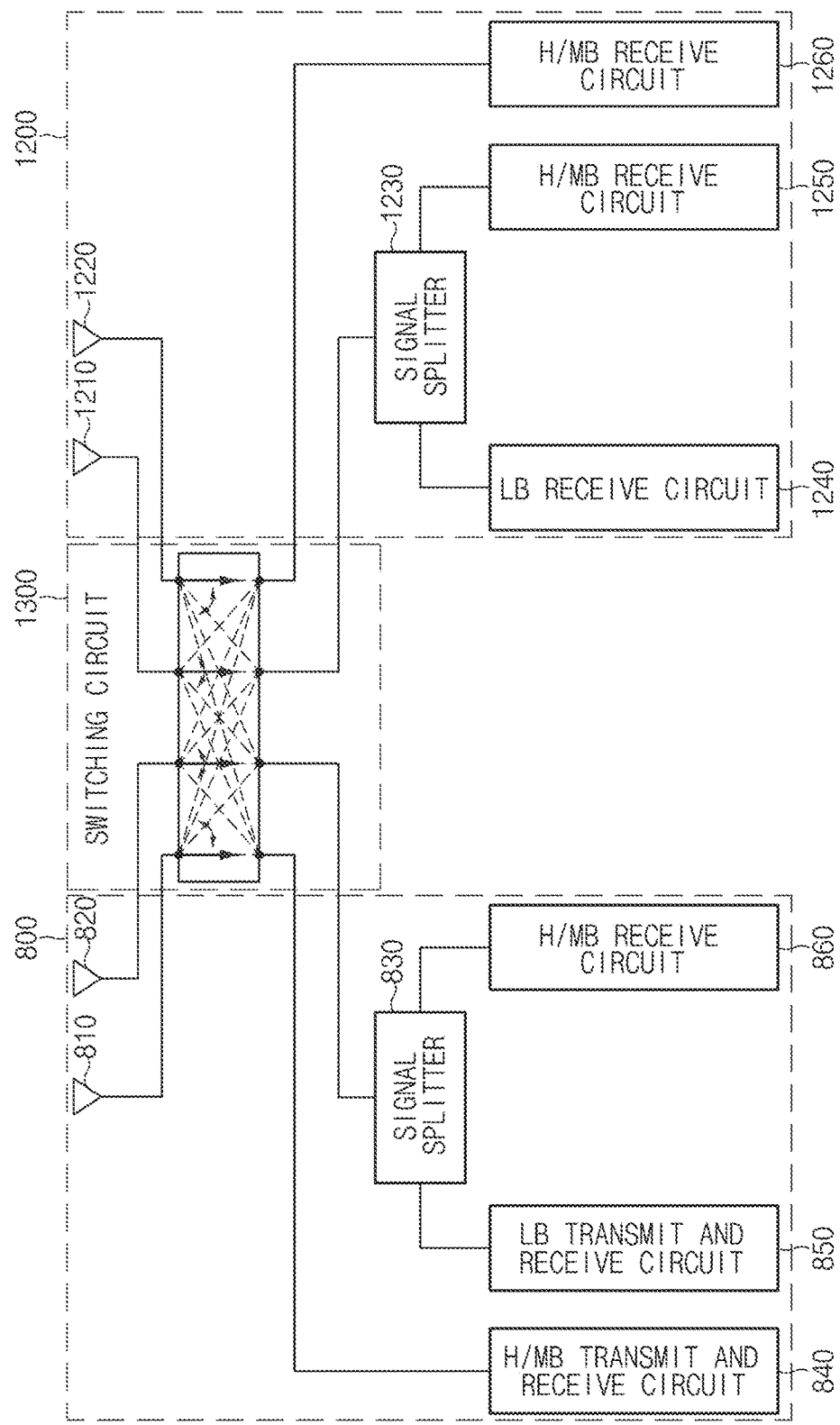
FIG. 8 is a block diagram illustrating an antenna and an RF circuit included in an electronic device according to an embodiment of the present disclosure.

FIG. 8 is a block diagram illustrating an antenna and an RF circuit included in an electronic device according to an embodiment of the present disclosure.

Referring to FIG. 8, the electronic device according to an embodiment may simultaneously receive an HB signal and an MB signal via four antennas. For example, a signal received via a first antenna 810 or a second antenna 820 may be transmitted to one of circuits included in a main unit 800 and a diversity unit 1200 via a switching circuit 1300 or a signal splitter 830 based on a band of the signal. Simultaneously, a signal received via a third antenna 1210 or a fourth antenna 1220 may be transmitted to one of circuits included in the main unit 800 and the diversity unit 1200 via the switching circuit 1300 and/or a signal splitter 1230 based on a band of the signal.

According to various embodiments of the present disclosure, the electronic device may include the switching circuit 1300. The switching circuit 1300 may change a connection between the first antenna 810, the second antenna 820, the third antenna 1210, and the fourth antenna 1220 and a communication circuit. The switching circuit 1300 may electrically connect, for example, one of the first antenna 810, the second antenna 820, the third antenna 1210, or the fourth antenna 1220 with one of an H/MB transmit and receive circuit 840, the signal splitter 830, the signal splitter 1230, or an H/MB receive circuit 1260. The switching circuit 1300 may operate such that the first antenna 810, the second antenna 820, the third antenna 1210, and the fourth antenna 1220 are not connected with the same component. An operation of the switching circuit 1300 may be controlled by, for example, a control circuit and a transceiver (or a CP). The signal splitter 1230 may transmit the transmitted signal to an LB receive circuit 1240, an H/MB receive circuit 1250, or an H/MB receive circuit 1256 based on a band of the signal.

As described above, the first antenna 810 or the second antenna 820 may connect to a second communication circuit of the diversity unit 1200 via the switching circuit 1300. As another example, the third antenna 1210 or the fourth antenna 1220 may connect to a first communication circuit of the main unit 800 via the switching circuit 1300.

According to an embodiment of the present disclosure, a transmit signal generated by the H/MB transmit and receive circuit 840 or a transmit signal generated by an LB transmit and receive circuit 850 or an H/MB receive circuit 860 may be transmitted using any one of the first antenna 810, the second antenna 820, the third antenna 1210, and the fourth antenna 1220. In this regard, the communication circuit may perform an antenna switching operation associated with the first antenna 810, the second antenna 820, the third antenna 1210, and the fourth antenna 1220 based on a level of a transmit power, whether the electronic device is held, and the like. In this operation, the communication circuit may perform an antenna switching operation between designated antennas based on a type of a network and an available frequency band. For example, the communication circuit may perform an antenna switching operation between the first antenna 810 and the third antenna 1210 or an antenna switching operation between the first antenna 810 and the second antenna 820, based on a type of a network and an available frequency band.

According to various embodiments described in the present disclosure, the electronic device may more efficiently operate a transmit antenna by transmitting data based on an antenna having a relatively good wireless environment among a plurality of antennas.

In addition, the electronic device may provide a variety of effects directly or indirectly ascertained through the present disclosure.

Figure 9:
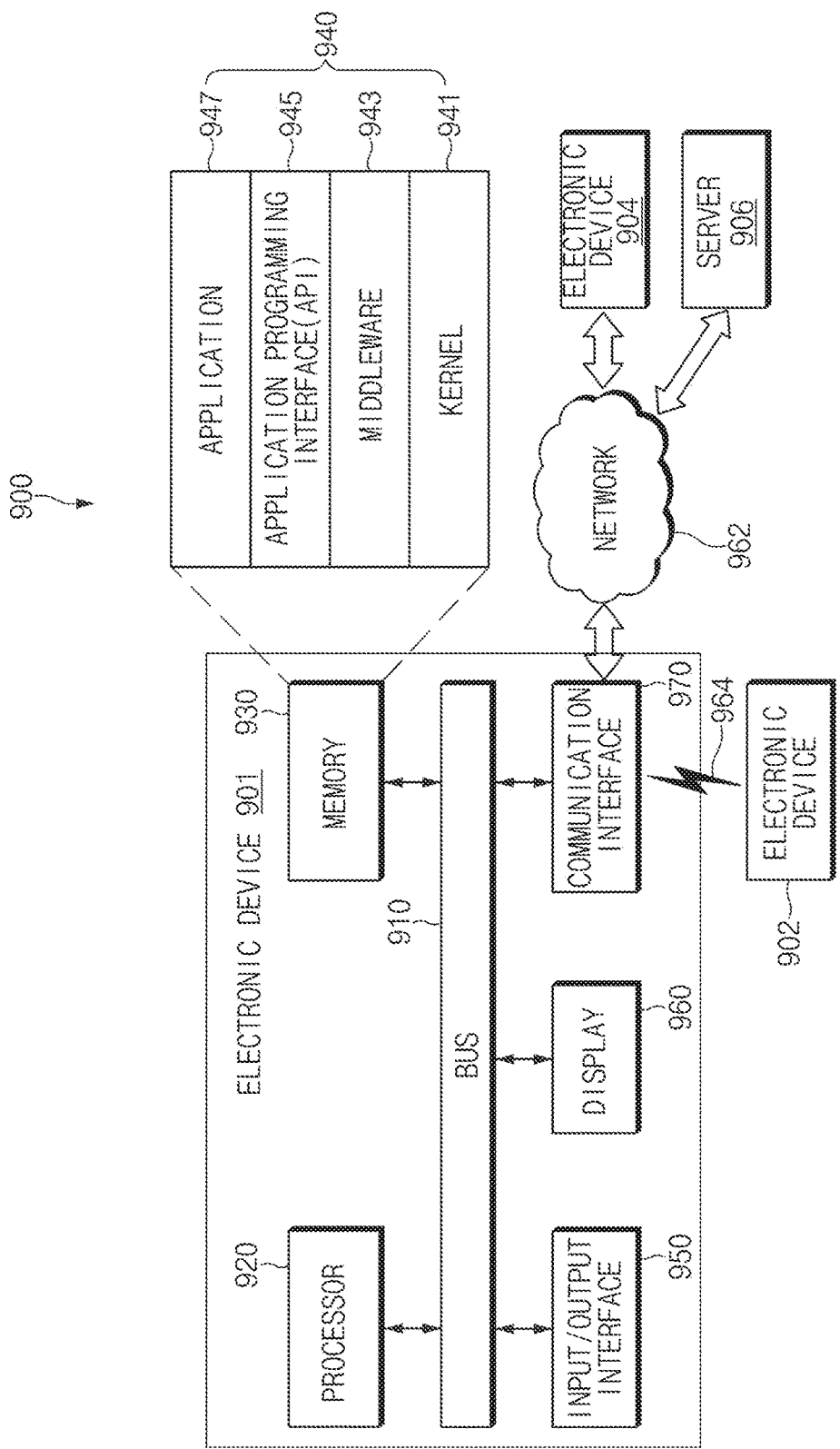
FIG. 9 is a block diagram illustrating a configuration of an electronic device in a network environment according to an embodiment of the present disclosure.

FIG. 9 is a block diagram illustrating a configuration of an electronic device in a network environment according to an embodiment of the present disclosure.

Referring to FIG. 9, in various embodiments of the present disclosure, an electronic device 901 and a first external electronic device 902, a second external electronic device 904, or a server 906 may connect with each other through a network 962 or local-area communication 964. The electronic device 901 may include a bus 910, a processor 920, a memory 930, an input and output interface 950, a display 960, and a communication interface 970. In various embodiments of the present disclosure, at least one of the components may be omitted from the electronic device 901, or other components may be additionally included in the electronic device 901.

The bus 910 may be, for example, a circuit which connects the components 920 to 970 with each other and transmits a communication signal (e.g., a control message and/or data) between the components.

The processor 920 may include one or more of a CPU, an AP, or a CP. For example, the processor 920 may perform calculation or data processing about control and/or communication of at least another of the components of the electronic device 901.

The memory 930 may include a volatile and/or non-volatile memory. The memory 930 may store, for example, a command or data associated with at least another of the components of the electronic device 901. According to an embodiment of the present disclosure, the memory 930 may store software and/or a program 940. The program 940 may include, for example, a kernel 941, a middleware 943, an application programming interface (API) 945, and/or an least one application program 947 (or "at least one application"), and the like. At least part of the kernel 941, the middleware 943, or the API 945 may be referred to as an operating system (OS).

The kernel 941 may control or manage, for example, system resources (e.g., the bus 910, the processor 920, or the memory 930, and the like) used to execute an operation or function implemented in the other programs (e.g., the middleware 943, the API 945, or the application program 947). In addition, as the middleware 943, the API 945, or the application program 947 accesses a separate component of the electronic device 901, the kernel 941 may provide an interface which may control or manage system resources.

The middleware 943 may play a role as, for example, a go-between such that the API 945 or the application program 947 communicates with the kernel 941 to communicate data.

In addition, the middleware 943 may process one or more work requests, received from the application program 947, in order of priority. For example, the middleware 943 may assign priority which may use system resources (the bus 910, the processor 920, or the memory 930, and the like) of the electronic device 901 to at least one of the at least one application program 947. For example, the middleware 943 may perform scheduling or load balancing for the one or more work requests by processing the one or more work requests in order of the priority assigned to the at least one of the at least one application program 947.

The API 945 may be, for example, an interface in which the application program 947 controls a function provided from the kernel 941 or the middleware 943. For example, the API 945 may include at least one interface or function (e.g., a command) for file control, window control, image processing, or text control, and the like.

The input and output interface 950 may play a role as, for example, an interface which may transmit a command or data input from a user or another external device to another component (or other components) of the electronic device 901. In addition, input and output interface 950 may output an instruction or data received from another component (or other components) of the electronic device 901 to the user or the other external device.

The display 960 may include, for example, a liquid crystal display (LCD), a light emitting diode (LED) display, an organic LED (OLED) display, a microelectromechanical systems (MEMS) display, or an electronic paper display. The display 960 may display, for example, a variety of content (e.g., text, images, videos, icons, or symbols, and the like) to the user. The display 960 may include a touch screen, and may receive, for example, touch, gesture, proximity, or a hovering input using an electronic pen or part of a body of the user.

The communication interface 970 may establish communication between, for example, the electronic device 901 and an external device (e.g., a first external electronic device 902, a second external electronic device 904, or a server 906). For example, the communication interface 970 may connect to a network 962 through wireless communication or wired communication and may communicate with the external device (e.g., the second external electronic device 904 or the server 906).

The wireless communication may use, for example, at least one of LTE, LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. In addition, the wireless communication may include, for example, local-area communication 964. The local-area communication 964 may include, for example, at least one of Wi-Fi communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 901 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 962 may include a telecommunications network, for example, at least one of a computer network (e.g., a local area network (LAN) or a wide area network (WAN)), the Internet, or a telephone network.

Each of the first and second external electronic devices 902 and 904 may be the same as or different device from the electronic device 901. According to an embodiment of the present disclosure, the server 906 may include a group of one or more servers. According to various embodiments of the present disclosure, all or some of operations executed in the electronic device 901 may be executed in another electronic device or a plurality of electronic devices (e.g., the first external electronic device 902, the second external electronic device 904, or the server 906). According to an embodiment of the present disclosure, if the electronic device 901 should perform any function or service automatically or according to a request, it may request another device (e.g., the first external electronic device 902, the second external electronic device 904, or the server 906) to perform at least part of the function or service, rather than executing the function or service for itself or in addition to the function or service. The other electronic device (e.g., the first external electronic device 902, the second external electronic device 904, or the server 906) may execute the requested function or the added function and may transmit the executed result to the electronic device 901. The electronic device 901 may process the received result without change or additionally and may provide the requested function or service. For this purpose, for example, cloud computing technologies, distributed computing technologies, or client-server computing technologies may be used.

Figure 10:
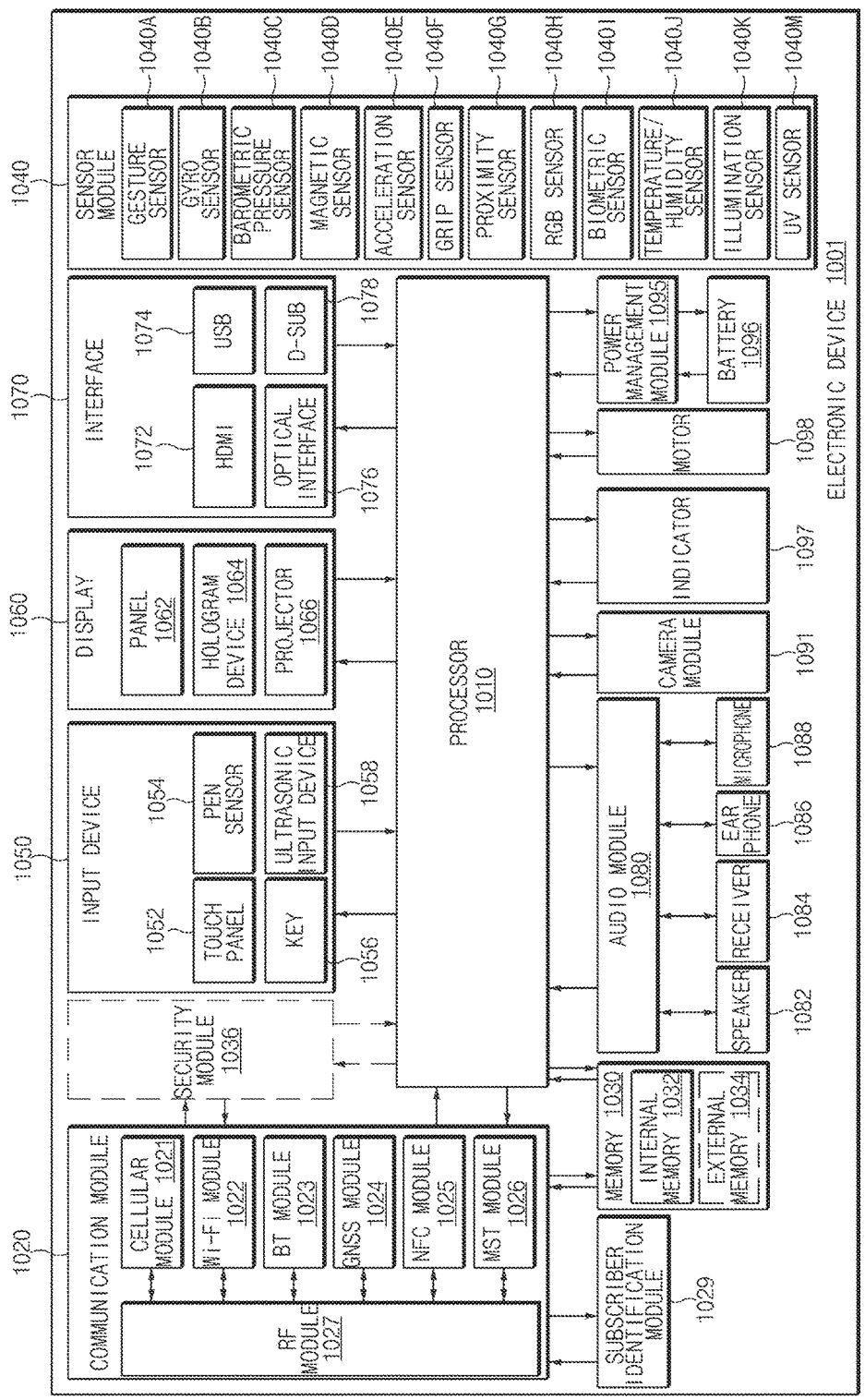
FIG. 10 is a block diagram illustrating a configuration of an electronic device according to various embodiments of the present disclosure.

FIG. 10 is a block diagram illustrating a configuration of an electronic device according to various embodiments of the present disclosure.

Referring to FIG. 10, an electronic device 1001 may include, for example, all or part of the electronic device 901 shown in FIG. 9. The electronic device 1001 may include one or more processors 1010 (e.g., APs), a communication module 1020, a subscriber identification module (SIM) 1029, a memory 1030, a security module 1036, a sensor module 1040, an input device 1050, a display 1060, an interface 1070, an audio module 1080, a camera module 1091, a power management module 1095, a battery 1096, an indicator 1097, and a motor 1098.

The processor 1010 may drive, for example, an OS or an application program to control a plurality of hardware or software components connected thereto and may process and compute a variety of data. The processor 1010 may be implemented with, for example, a system on chip (SoC). According to an embodiment of the present disclosure, the processor 1010 may include a graphic processing unit (GPU) (not shown) and/or an image signal processor (ISP) (not shown). The processor 1010 may include at least some (e.g., a cellular module 1021) of the components shown in FIG. 10. The processor 1010 may load a command or data received from at least one of other components (e.g., a non-volatile memory) into a volatile memory to process the data and may store various data in a non-volatile memory.

The communication module 1020 may have the same or similar configuration to a communication interface 970 of FIG. 9. The communication module 1020 may include, for example, the cellular module 1021, a Wi-Fi module 1022, a Bluetooth (BT) module 1023, a GNSS module 1024 (e.g., a GPS module, a Glonass module, a Beidou module, or a Galileo module), a NFC module 1025, an MST module 1026, and a RF module 1027.

The cellular module 1021 may provide, for example, a voice call service, a video call service, a text message service, or an Internet service, and the like through a communication network. According to an embodiment of the present disclosure, the cellular module 1021 may identify and authenticate the electronic device 1001 in a communication network using the SIM 1029 (e.g., a SIM card). According to an embodiment of the present disclosure, the cellular module 1021 may perform at least part of functions which may be provided by the processor 1010. According to an embodiment of the present disclosure, the cellular module 1021 may include a CP.

The Wi-Fi module 1022, the BT module 1023, the GNSS module 1024, the NFC module 1025, or the MST module 1026 may include, for example, a processor for processing data transmitted and received through the corresponding module. According to various embodiments of the present disclosure, at least some (e.g., two or more) of the cellular module 1021, the Wi-Fi module 1022, the BT module 1023, the GNSS module 1024, the NFC module 1025, or the MST module 1026 may be included in one integrated chip (IC) or one IC package.

The RF module 1027 may transmit and receive, for example, a communication signal (e.g., an RF signal). Though not shown, the RF module 1027 may include, for example, a transceiver, a power amplifier module (PAM), a frequency filter, or a low noise amplifier (LNA), or an antenna, and the like. According to another embodiment of the present disclosure, at least one of the cellular module 1021, the Wi-Fi module 1022, the BT module 1023, the GNSS module 1024, the NFC module 1025, or the MST module 1026 may transmit and receive an RF signal through a separate RF module.

The SIM 1029 may include, for example, a card which includes a SIM and/or an embedded SIM. The SIM 1029 may include unique identification information (e.g., an integrated circuit card identifier (ICCID)) or subscriber information (e.g., an international mobile subscriber identity (IMSI)).

The memory 1030 (e.g., a memory 930 of FIG. 9) may include, for example, an embedded memory 1032 or an external memory 1034. The embedded memory 1032 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1034 may include a flash drive, for example, a compact flash (CF), a secure digital (SD), a micro-SD, a mini-SD, an extreme digital (xD), a multimedia car (MMC), or a memory stick, and the like. The external memory 1034 may operatively and/or physically connect with the electronic device 1001 through various interfaces.

The security module 1036 may be a module which has a relatively higher secure level than the memory 1030 and may be a circuit which stores secure data and guarantees a protected execution environment. The security module 1036 may be implemented with a separate circuit and may include a separate processor. The security module 1036 may include, for example, an embedded secure element (eSE) which is present in a removable smart chip or a removable SD card or is embedded in a fixed chip of the electronic device 1001. In addition, the security module 1036 may be driven by an OS different from the OS of the electronic device 1001. For example, the security module 1036 may operate based on a java card open platform (JCOP) OS.

The sensor module 1040 may measure, for example, a physical quantity or may detect an operation state of the electronic device 1001, and may convert the measured or detected information to an electric signal. The sensor module 1040 may include at least one of, for example, a gesture sensor 1040A, a gyro sensor 1040B, a barometer sensor 1040C, a magnetic sensor 1040D, an acceleration sensor 1040E, a grip sensor 1040F, a proximity sensor 1040G, a color sensor 1040H (e.g., red, green, blue (RGB) sensor), a biometric sensor 1040I, a temperature/humidity sensor 1040J, an illumination sensor 1040K, or an ultraviolet (UV) sensor 1040M. Additionally or alternatively, the sensor module 1040 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1040 may further include a control circuit for controlling at least one or more sensors included therein. According to various embodiments of the present disclosure, the electronic device 1001 may further include a processor configured to control the sensor module 1040, as part of the processor 1010 or to be independent of the processor 1010. While the processor 1010 is in a sleep state, the electronic device 1001 may control the sensor module 1040.

The input device 1050 may include, for example, a touch panel 1052, a (digital) pen sensor 1054, a key 1056, or an ultrasonic input device 1058. The touch panel 1052 may use at least one of, for example, a capacitive type, a resistive type, an infrared type, or an ultrasonic type. In addition, the touch panel 1052 may further include a control circuit. The touch panel 1052 may further include a tactile layer and may provide a tactile reaction to a user.

The (digital) pen sensor 1054 may be, for example, part of the touch panel 1052 or may include a separate sheet for recognition. The key 1056 may include, for example, a physical button, an optical key, or a keypad. The ultrasonic input device 1058 may allow the electronic device 1001 to detect a sound wave using a microphone (e.g., a microphone 1088) and to obtain (or verify) data through an input tool generating an ultrasonic signal.

The display 1060 (e.g., a display 960 of FIG. 9) may include a panel 1062, a hologram device 1064, or a projector 1066. The panel 1062 may include the same or similar configuration to the display 1060 or 960. The panel 1062 may be implemented to be, for example, flexible, transparent, or wearable. The panel 1062 and the touch panel 1052 may be integrated into one module. The hologram device 1064 may show a stereoscopic image in a space using interference of light. The projector 1066 may project light onto a screen to display an image. The screen may be positioned, for example, inside or outside the electronic device 1001. According to an embodiment of the present disclosure, the display 1060 may further include a control circuit for controlling the panel 1062, the hologram device 1064, or the projector 1066.

The interface 1070 may include, for example, an HDMI 1072, a USB 1074, an optical interface 1076, or a D-sub-miniature 1078. The interface 1070 may be included in, for example, a communication interface 170 or 970 shown in FIG. 2 or 9. Additionally or alternatively, the interface 1070 may include, for example, a mobile high definition link (MHL) interface, an SD card/multimedia card (MMC) interface, or an infrared data association (IrDA) standard interface.

The audio module 1080 may convert a sound and an electric signal in dual directions. At least part of components of the audio module 1080 may be included in, for example, an input and output interface 950 (or a user interface) shown in FIG. 9. The audio module 1080 may process sound information input or output through, for example, a speaker 1082, a receiver 1084, an earphone 1086, or the microphone 1088, and the like.

The camera module 1091 may be a device which captures a still image and a moving image. According to an embodiment of the present disclosure, the camera module 1091 may include one or more image sensors (not shown) (e.g., a front sensor or a rear sensor), a lens (not shown), an ISP (not shown), or a flash (not shown) (e.g., an LED or a xenon lamp).

The power management module 1095 may manage, for example, power of the electronic device 1001. According to an embodiment of the present disclosure, though not shown, the power management module 1095 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1096 and voltage, current, or temperature thereof while the battery 1096 is charged. The battery 1096 may include, for example, a rechargeable battery or a solar battery.

The indicator 1097 may display a specific state of the electronic device 1001 or part (e.g., the processor 1010) thereof, for example, a booting state, a message state, or a charging state, and the like. The motor 1098 may convert an electric signal into mechanical vibration and may generate vibration or a haptic effect, and the like. Though not shown, the electronic device 1001 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. In addition, some of the elements of the electronic device according to various embodiments of the present disclosure may be combined with each other to form one entity, thereby making it possible to perform the functions of the corresponding elements in the same manner as before the combination.

Figure 11:
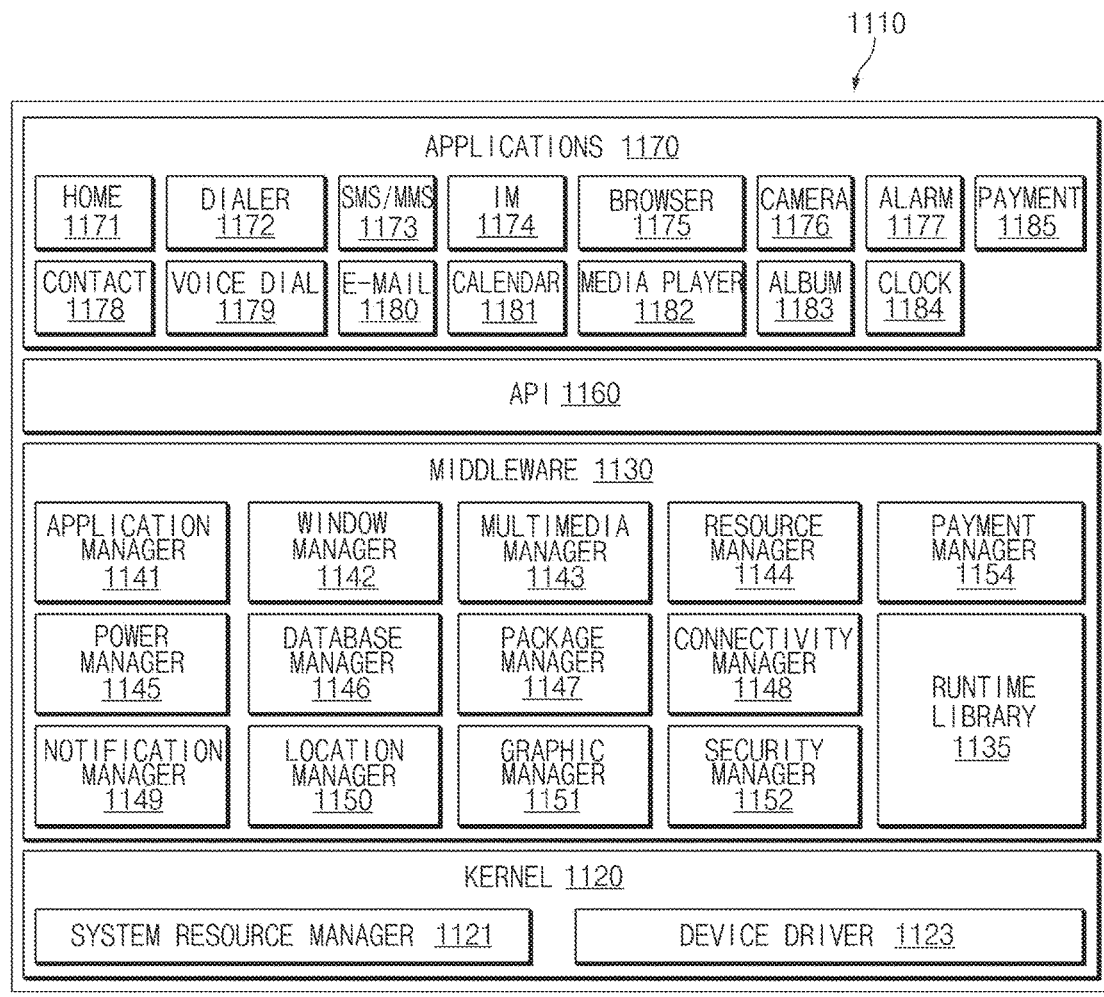
FIG. 11 is a block diagram illustrating a configuration of a program module according to various embodiments of the present disclosure.

FIG. 11 is a block diagram illustrating a configuration of a program module according to various embodiments of the present disclosure.

Referring to FIG. 11, according to an embodiment of the present disclosure, a program module 1110 (e.g., the program 940 of FIG. 9) may include an OS for controlling resources associated with an electronic device (e.g., the electronic device 901 of FIG. 9) and/or various applications (e.g., the application program 947 of FIG. 9) which are executed on the OS. The OS may be, for example, Android, iOS, Windows, Symbian, Tizen, or Bada, and the like.

The program module 1110 may include a kernel 1120, a middleware 1130, an application programming interface (API) 1160, and/or an application 1170. At least part of the program module 1110 may be preloaded on the electronic device, or may be downloaded from an external electronic device (e.g., the first external electronic device 902, the second external electronic device 904, or the server 906, and the like of FIG. 9).

The kernel 1120 (e.g., the kernel 941 of FIG. 9) may include, for example, a system resource manager 1121 and/or a device driver 1123. The system resource manager 1121 may control, assign, or collect, and the like system resources. According to an embodiment of the present disclosure, the system resource manager 1121 may include a process management unit, a memory management unit, or a file system management unit, and the like. The device driver 1123 may include, for example, a display driver, a camera driver, a BT driver, a shared memory driver, a USB driver, a keypad driver, a Wi-Fi driver, an audio driver, or an inter-process communication (IPC) driver.

The middleware 1130 (e.g., the middleware 943 of FIG. 9) may provide, for example, functions the application 1170 needs in common, and may provide various functions to the application 1170 through the API 1160 such that the application 1170 efficiently uses limited system resources in the electronic device. According to an embodiment of the present disclosure, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, a security manager 1152, or a payment manager 1154.

The runtime library 1135 may include, for example, a library module used by a compiler to add a new function through a programming language while the application 1170 is executed. The runtime library 1135 may perform a function about input and output management, memory management, or an arithmetic function.

The application manager 1141 may manage, for example, a life cycle of at least one of the application 1170. The window manager 1142 may manage graphic user interface (GUI) resources used on a screen of the electronic device. The multimedia manager 1143 may determine a format utilized for reproducing various media files and may encode or decode a media file using a codec corresponding to the corresponding format. The resource manager 1144 may manage source codes of at least one of the application 1170, and may manage resources of a memory or a storage space, and the like.

The power manager 1145 may act together with, for example, a basic input/output system (BIOS) and the like, may manage a battery or a power source, and may provide power information utilized for an operation of the electronic device. The database manager 1146 may generate, search, or change a database to be used in at least one of the application 1170. The package manager 1147 may manage installation or update of an application distributed by a type of a package file.

The connectivity manager 1148 may manage, for example, wireless connection, such as Wi-Fi connection or BT connection, and the like. The notification manager 1149 may display or notify events, such as an arrival message, an appointment, and proximity notification, by a method which is not disturbed to the user. The location manager 1150 may manage location information of the electronic device. The graphic manager 1151 may manage a graphic effect to be provided to the user or a user interface (UI) related to the graphic effect. The security manager 1152 may provide all security functions utilized for system security or user authentication, and the like. According to an embodiment of the present disclosure, when the electronic device (e.g., an electronic device 100 or 901 of FIG. 1 or 9) has a phone function, the middleware 1130 may further include a telephony manager (not shown) for managing a voice or video communication function of the electronic device.

The middleware 1130 may include a middleware module which configures combinations of various functions of the above-described components. The middleware 1130 may provide a module which specializes according to kinds of OSs to provide a differentiated function. In addition, the middleware 1130 may dynamically delete some of old components or may add new components.

The API 1160 (e.g., an API 945 of FIG. 9) may be, for example, a set of API programming functions, and may be provided with different components according to OSs. For example, in case of Android or iOS, one API set may be provided according to platforms. In case of Tizen, two or more API sets may be provided according to platforms.

The application 1170 (e.g., an application program 947 of FIG. 9) may include one or more of, for example, a home application 1171, a dialer application 1172, a short message service/multimedia message service (SMS/MMS) application 1173, an instant message (IM) application 1174, a browser application 1175, a camera application 1176, an alarm application 1177, a contact application 1178, a voice dial application 1179, an e-mail application 1180, a calendar application 1181, a media player application 1182, an album application 1183, a clock application 1184, a payment application 1185, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 1170 may include an application (hereinafter, for better understanding and ease of description, referred to as "information exchange application") for exchanging information between the electronic device (e.g., the electronic device 901 of FIG. 9) and an external electronic device (e.g., the first external electronic device 902 or the second external electronic device 904). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 902 or the second external electronic device 904). In addition, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 902 or the second external electronic device 904) which communicates with the electronic device, an application which operates in the external electronic device, or a service (e.g., a call service or a message service) provided from the external electronic device.

According to an embodiment of the present disclosure, the application 1170 may include an application (e.g., the health card application of a mobile medical device) which is preset according to attributes of the external electronic device (e.g., the first external electronic device 902 or the second external electronic device 904). According to an embodiment of the present disclosure, the application 1170 may include an application received from the external electronic device (e.g., the server 906, the first external electronic device 902, or the second external electronic device 904). According to an embodiment of the present disclosure, the application 1170 may include a preloaded application or a third party application which may be downloaded from a server. Names of the components of the program module 1110 according to various embodiments of the present disclosure may differ according to kinds of OSs.

According to various embodiments of the present disclosure, at least part of the program module 1110 may be implemented with software, firmware, hardware, or at least two or more combinations thereof. At least part of the program module 1110 may be implemented (e.g., executed) by, for example, a processor (e.g., a processor 920 of FIG. 9). At least part of the program module 1110 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. In addition, some operations may be executed in a different order or may be omitted, and other operations may be added.

Various embodiments of the present disclosure described and shown in the drawings are provided as examples to describe technical content and help understanding but do not limit the present disclosure. Accordingly, it should be interpreted that besides the various embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium, such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, and the like, that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a digital signal processor (DSP), a programmable logic device (PLD), an ASIC, a Field-Programmable Gate Array (FPGA), a GPU, a video card controller, and the like. In addition, it would be recognized that when a general purpose computer accesses code for implementing the processing shown herein, the execution of the code transforms the general purpose computer into a special purpose computer for executing the processing shown herein. Any of the functions and operations provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a plurality of antennas; and
    a communication circuit configured to electrically connect with at least one of the plurality of antennas,
    wherein the communication circuit is configured to:
        obtain a transmit power level,
        transmit a signal based on a first antenna among the plurality of antennas if the transmit power level is less than a predetermined level,
        determine a second antenna for signal transmission among the plurality of antennas and perform an antenna switching operation of selecting the second antenna, if the transmit power level is greater than or equal to the predetermined level,
        increase an interval at which a communication characteristic value associated with the antenna switching operation is collected, if a level of a communication characteristic value of an antenna which is being currently operated is greater than or equal to a first level, if a difference between communication characteristic values of the plurality of antennas is greater than or equal to a setting value, or if the transmit power level is less than a second level, and
        decrease the interval at which the communication characteristic value associated with the antenna switching operation is collected, if the level of the communication characteristic value of the antenna which is being currently operated is less than the first level, if the difference between the communication characteristic values of the plurality of antennas is less than the setting value, or if the transmit power level is greater than or equal to the second level.

2. The electronic device of claim 1, wherein the communication circuit is further configured to:
    perform the antenna switching operation based on a type of a network and based on at least one of the plurality of antennas or an available frequency band.

3. The electronic device of claim 2, wherein the communication circuit is configured to:
    select at least one antenna as a data transmit and receive antenna based on the type of the network or the available frequency band, and
    perform a switching operation with an antenna spaced apart from the first antenna at an interval in a first direction of the electronic device when performing the antenna switching operation, or perform a switching operation with an antenna spaced apart from the first antenna at an interval in a second direction of the electronic device.

4. The electronic device of claim 2, wherein the communication circuit is further configured to:
    detect communication characteristic values of a set of antennas that are not being currently operated, at a period if a sub-antenna except for an antenna matched to the type of the network or the available frequency band is being currently operated, and
    perform the antenna switching operation.

5. The electronic device of claim 2, wherein the communication circuit is further configured to:
    if the type of the network or the available frequency band is changed, operate an antenna matched to the changed type of the network or the changed available frequency band as the first antenna, and
    perform the antenna switching operation based on the transmit power level.

6. The electronic device of claim 1,
    wherein the communication circuit comprises:
        a processor; and
        a switching circuit configured to connect the processor with at least one of the plurality of antennas, and
    wherein the processor is configured to:
        if detecting a sub-antenna having a communication characteristic value which is better than a communication characteristic value of a main antenna matched to a type of a network which is being currently operated or an available frequency band by a first level or more, establish a communication path comprising the sub-antenna.

7. The electronic device of claim 6, wherein the processor is further configured to:
    if detecting the main antenna having a communication characteristic value which is better than a communication characteristic value of the sub-antenna which is being currently operated by a second level or more, establish a communication path comprising the main antenna.

8. The electronic device of claim 7, wherein the second level is lower than the first level.

9. The electronic device of claim 1, wherein the communication circuit is further configured to:
    activate at least one antenna, which is in an inactive state, at an interval,
    collect a communication characteristic value of the activated antenna, and
    deactivate antennas which are not selected after performing the antenna switching operation.

10. The electronic device of claim 1, wherein the communication circuit is further configured to:
    detect a communication characteristic value based on a data frame of an interval of a data communication channel, if the electronic device is in a data transmit and receive state when performing the antenna switching operation, and detect a communication characteristic value based on control data received during a plurality of periods, if the electronic device is in a data communication waiting state.

11. A method for selecting a transmit antenna, the method comprising:

selecting a first antenna of one group corresponding to a type of a network and an available frequency band among a plurality of antennas;

obtaining a transmit power level of the first antenna used for data transmission among the plurality of antennas;

performing signal transmission based on the first antenna if the transmit power level of the first antenna is less than a predetermined level;

selecting a second antenna for signal transmission among the plurality of antennas if the transmit power level is greater than or equal to the predetermined level;

increasing an interval at which a communication characteristic value associated with an antenna switching operation is collected, if a level of a communication characteristic value of an antenna which is being currently operated is greater than or equal to a first level, if a difference between communication characteristic values of the plurality of antennas is greater than or equal to a setting value, or if the level of the transmit power is less than a second level; and decreasing the interval at which the communication characteristic value associated with the antenna switching operation is collected, if the level of the communication characteristic value of the antenna which is being currently operated is less than the first level, if the difference between the communication characteristic values of the plurality of antennas is less than the setting value, or if the level of the transmit power is greater than or equal to the second level.

12. The method of claim 11, wherein the selecting of the second antenna comprises:

performing a switching operation with an antenna spaced apart from a designated antenna at an interval in a first direction of an electronic device; or performing a switching operation with an antenna spaced apart from the designated antenna at an interval in a second direction of the electronic device.

13. The method of claim 11, wherein the selecting of the second antenna comprises:

detecting communication characteristic values of a set of antennas that are not being currently operated, at a period if a sub-antenna except for an antenna matched to the type of the network or the available frequency band is being currently operated; and performing antenna switching.

14. The method of claim 11, wherein the selecting of the second antenna comprises:

if the type of the network or the available frequency band is changed, operating an antenna matched to the changed type of the network or the changed available frequency band as a designated antenna; and performing antenna switching based on the transmit power level.

15. The method of claim 11, wherein the selecting of the second antenna comprises:

if a sub-antenna having a communication characteristic value which is better than a communication characteristic value of a main antenna matched to a type of a network which is being currently operated or an available frequency band by a first level or more is detected, establishing a communication path comprising the sub-antenna.

16. The method of claim 15, wherein the selecting of the second antenna comprises:

if the main antenna having a communication characteristic value which is better than a communication characteristic value of the sub-antenna which is being currently operated by a second level or more, establishing a communication path comprising the main antenna.

17. The method of claim 11, wherein the selecting of the second antenna comprises:

activating at least one antenna, which is in an inactive state, at an interval and collecting a communication characteristic value of the activated antenna; and deactivating antennas which are not selected after an antenna switching operation is performed.

18. The method of claim 11, wherein the selecting of the second antenna comprises:

detecting a communication characteristic value based on a data frame of an interval of a data communication channel, if an electronic device is in a data transmit and receive state when an antenna switching operation is performed; and detecting a communication characteristic value based on control data received during a plurality of periods, if the electronic device is in a data communication waiting state.

* * * * *